(12) United States Patent
Sisbot

(10) Patent No.: US 10,339,720 B2
(45) Date of Patent: *Jul. 2, 2019

(54) METHOD OF GROUND ADJUSTMENT FOR IN-VEHICLE AUGMENTED REALITY SYSTEMS

(71) Applicant: TOYOTA JIDOSHA KABUSHIKI KAISHA, Toyota-shi, Aichi-ken (JP)

(72) Inventor: Emrah Akin Sisbot, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,220

(22) Filed: Jul. 16, 2018

(65) Prior Publication Data

US 2018/0330547 A1 Nov. 15, 2018

Related U.S. Application Data

(63) Continuation of application No. 15/250,908, filed on Aug. 29, 2016, now Pat. No. 10,049,499.

(51) Int. Cl.
*G06T 19/00* (2011.01)
*G06T 15/20* (2011.01)
(Continued)

(52) U.S. Cl.
CPC .............. *G06T 19/006* (2013.01); *B60R 1/00* (2013.01); *G06T 15/20* (2013.01); *G06T 17/05* (2013.01);
(Continued)

(58) Field of Classification Search
None
See application file for complete search history.

(56) References Cited

U.S. PATENT DOCUMENTS

| 2011/0254833 | A1 | 10/2011 | McDaniel et al. |
| 2012/0059720 | A1 | 3/2012 | Musabji et al. |
| 2013/0315446 | A1 | 11/2013 | Ben Tzvi |

FOREIGN PATENT DOCUMENTS

| JP | 2005-145434 | 6/2005 |
| JP | 2010-256878 | 11/2010 |
| JP | 2016-001109 | 1/2016 |

OTHER PUBLICATIONS

NOAA, "What is LIDAR?", https://web.archive.org/web/20151226150603/https://oceanservice.noaa.gov/facts/lidar.htnnl, Dec. 2015. Year: ( 2015).*

(Continued)

*Primary Examiner* — Nicholas R Wilson
(74) *Attorney, Agent, or Firm* — Burbage Law, P.C.; Jon-Michael Burbage; Elizabeth Ruzich

(57) ABSTRACT

The disclosure includes implementations for providing ground adjustment for an in-vehicle augmented reality system. A system may include a three-dimensional heads-up display unit ("3D HUD") installed in a vehicle. The system may include a memory storing instructions that, when executed, cause the system to: determine a plurality of elevation values for a plurality of points on a road surface, where each elevation value is associated with a point from the plurality of points and describes the elevation of that point; identify a graphic for display on the 3D HUD, where the graphic is associated with at least one point from the plurality of points; determine which location of the 3D HUD is associated with the at least one point associated with the graphic; and display the graphic at the location of the 3D HUD so that the graphic superposes the point when viewed by a driver.

20 Claims, 11 Drawing Sheets

(51) Int. Cl.
*B60R 1/00*   (2006.01)
*H04W 4/80*   (2018.01)
*G06T 17/05*  (2011.01)

(52) U.S. Cl.
CPC ......... *H04W 4/80* (2018.02); *B60R 2300/205* (2013.01); *G06T 2200/04* (2013.01)

(56) References Cited

OTHER PUBLICATIONS

Wei et al., "Towards a Viable Autonomous Driving Research Platform", IEEE, 2013. (Year: 2013).*

Mishor, "The Arrival of Contextual and Augmented Reality HMI Over HUDs and How ShadowboxTM Can Help," https://slideblast.com/the-arrival-of-contextual-and-augmented-reality-hmi-_594ef2161723dd7c9766a0f3.html, Aug. 2013, 11 pages.

\* cited by examiner

METHOD OF GROUND ADJUSTMENT FOR IN-VEHICLE AUGMENTED REALITY SYSTEMS

CROSS-REFERENCE TO RELATED APPLICATIONS

This patent application is a continuation of U.S. patent application Ser. No. 15/250,908, entitled "Method of Ground Adjustment for In-Vehicle Augmented Reality Systems" and filed on Aug. 29, 2016, the entirety of which is hereby incorporated by reference.

BACKGROUND

The specification relates to ground adjustment for in-vehicle augmented reality systems.

Augmented reality applications are becoming increasingly popular. Some augmented reality applications exist for vehicles. These are known as "in-vehicle augmented reality systems."

Vehicles may be equipped with a heads-up display unit ("HUD"). Some in-vehicle augmented reality systems include a HUD. For example, the HUD displays graphics that improve or enhance a driving experience for a driver of the vehicle.

SUMMARY

One drawback of an in-vehicle augmented reality system including a HUD appears when the graphics the graphics displayed by the HUD is intended to overlay the surface of the road (or ground) as viewed by the driver when looking through the HUD, and the ground has uneven elevation (or terrain). See, for example, FIG. 1A. In this particular scenario if the varying terrain of the ground and the vehicle position are not carefully considered, then the graphics which should superpose with the ground is not correctly placed and observed by the driver when looking through the HUD. The ground adjustment application described herein beneficially solves this problem. See, for example, FIG. 1E.

Implementations of the ground adjustment application are described herein. These implementations may include accurately projecting a graphic onto a HUD so that the graphic accurately supposes the ground viewable by the driver when looking through the HUD.

In some implementations, a system of a vehicle including the ground adjustment application may include one or more of the following elements: a three-dimensional heads-up display unit ("3D HUD") installed in the vehicle; a set of vehicle sensors; and the ground adjustment application. The ground adjustment application may include, among other things, a road surface module, an elevation grid construction module and a graphics projection module. The ground adjustment application may be executable by a processor of the vehicle. The processor may be an element of an onboard vehicle computer, an engine control unit, a head unit, the 3D HUD or some other processor-based computing device of the vehicle.

An example implementation of the 3D HUD is described below with reference to FIG. 2B.

The set of vehicles sensors (or "sensor set") may include a plurality of vehicles sensors. The vehicle sensors may be configured to capture sensor data. The sensor data may include one or more of the following: pointcloud data describing the environment external to the vehicle (sometimes referred to as the "vehicle environment"); and six-dimensional pose data ("6D pose data") of the vehicle.

The pointcloud data describes, among other things, the varying terrain of the ground included in the vehicle environment. The sensor set may include one or more of the following vehicles sensors which may record the pointcloud data: one or more stereo cameras; one or more laser sensors; and one or more LIDAR sensors.

The 6D pose data describes and the vehicle position. For example, the 6D pose data may describe the three-dimensional translation ("3D translation") of the vehicle and the three-dimensional rotation ("3D rotation") of the vehicle. The sensor set may include one or more of the following vehicles sensors which may record the 6D pose data: one or more accelerometers; one or more gyroscopes; one or more speedometers; one or more global positioning system units ("GPS unit" if singular, "GPS units" if plural); and one or more cameras. In some implementations, the 6D pose data may be determined using one or more simultaneous localization and mapping ("SLAM" or "6D SLAM") techniques and/or one or more 6D pose estimation techniques, and the sensor set may include and sensors which may be necessary to perform these techniques.

Other vehicle sensors of the sensor set are described below. These vehicle sensors may contribute to the recordation of the pointcloud data and the 6D pose data.

In some implementations, the vehicle may include internal sensors record sensor data describing information about the driver. The internal sensors may track the eye position of the driver relative to a 3D HUD. For example, the internal sensors may record sensor data that describes where the driver's eyes are located and how objects or graphics viewable when looking at the 3D HUD appear to the driver when the driver is looking at the 3D HUD. The ground adjustment application may receive the sensor data from the internal sensors. The ground adjustment application may determine the eye position of the driver relative to the 3D HUD based on the sensor data received from the internal sensors.

In some implementations, the vehicle may include external sensors that record sensor data describing the vehicle environment. The external sensors may track the terrain or elevation changes of the ground in the vehicle environment, including the road surface.

The road surface segmentation module may analyze the pointcloud data and the 6D pose data. The road surface segmentation module may remove all points from the pointcloud data and the 6D pose data that do not describe the elevation of the road surface. The data resulting from this culling may be combined to form a data set referred to as the "surface elevation data." This surface elevation data describes the elevation of the road surface at different points along the road surface. The elevation of the road surface may change at different points, creating a varying terrain. In theory, the elevation of each discrete point in the road surface may be described by the surface elevation data so that the surface elevation data may describe the terrain of the entire road surface which the driver sees when looking through the 3D HUD.

The elevation grid construction module may generate an elevation grid representing the road surface. The elevation grid is a grid data structure that represents the portion of the road surface which the driver sees when looking through a 3D HUD of the vehicle. The size of the elevation grid may depend on the range of the vehicle sensors. The elevation grid is initially flat (see, e.g., FIG. 1C) and includes a plurality of cells (see, e.g., element 151 of FIG. 1C). Each of the cells may be assigned an elevation value (based on, e.g., the surface elevation data) which affects the elevation of that cell. This process may be repeated for each cell so that the elevation grid accurately represents the terrain of the portion of the road surface which the driver sees when looking through the 3D HUD. The elevation grid is initially flat as depicted in FIG. 1C because each of the cells is initially assigned an elevation value of zero.

As mentioned above, the surface elevation data may describe the elevations for different points on the road surface which are viewable by the driver when they look through the 3D HUD. The elevation grid includes cells which may collectively include each of the points on the road surface which are viewable by the driver when they look through the 3D HUD. The surface elevation data may be analyzed to determine an elevation value to assign to each cell of the elevation grid so that the elevation grid is no longer flat and accurately reflects the terrain of the road surface which is viewable by the driver when they look through the 3D HUD.

In practice, the surface elevation data may not include data that describes the elevation for each point of the road surface that is viewable by the driver when looking through the 3D HUD. The elevation grid construction module may identify each cell of the elevation grid having no elevation value assigned to it (e.g., because the surface elevation data did not include sensor data describing the elevation for this point on the road surface). For each cell identified as having no elevation assigned to it, the elevation grid construction module may interpolate an elevation value for that cell based on the elevation values of the neighboring cells. In this way each cell of the elevation grid is assured to be assigned an elevation value, thereby creating a realistic elevation grid as depicted in FIG. 1D.

The graphics projection module may now associate the elevation grid with the 3D HUD so that different portions of the 3D HUD are known to correspond to different points of the road surface in the real world (as represented by the plurality of cells of the elevation grid) and the elevation of the different points of the real world viewable by the driver when looking through the 3D HUD are known (see, e.g., FIG. 1E).

The graphics projection module may now project graphics onto the 3D HUD. For each portion of a graphic to be depicted onto the 3D HUD, the graphics projection module may determine which location in the real world is associated with the graphic and which cell or cells of the elevation grid correspond to that location. For example, if the graphic shows where the vehicle may turn left or right in a navigation route, then the graphic may be associated with the point in the roadway where the vehicle may turn left or right. The graphics projection module may project or display the graphic on the 3D HUD at the cell or cells that correspond to the location in the real world that are associated with the graphic (see, e.g., FIG. 1E). The graphics projection may be performed by a graphics processing unit ("GPU") or some other processor of the vehicle. The graphics projection may be performed in real time or substantially real time.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer program product including a non-transitory computer-usable medium including a computer-readable program, where the computer-readable program when executed on a computer of a vehicle causes the computer to: determine a plurality of elevation values for a plurality of points on a road surface that are viewable by a driver when seated in a vehicle looking through a 3D HUD installed in the vehicle, where each elevation value is associated with a point from the plurality of points and describes the elevation of that point so that the plurality of points collectively describe a terrain for the road surface; associate each of the plurality of points with a different location of the 3D HUD so that the elevation of each point of the road surface is known; identify a graphic for display on the 3D HUD, where the graphic is associated with at least one point from the plurality of points on the road surface; determine which location of the 3D HUD is associated with the at least one point associated with the graphic; and display the graphic at the location of the 3D HUD associated with the at least point in an orientation that is configured for the elevation of the point so that the graphic superposes the point when viewed by the driver when looking through the 3D HUD. Other embodiments of this aspect include corresponding computer systems, apparatus, and computer programs recorded on one or more computer storage devices, each configured to perform the actions of the methods.

Implementations may include one or more of the following features. The computer program product where the plurality of elevation values is determined based at least in part on pointcloud data describing the road surface. The computer program product where the pointcloud data describes the elevations of the plurality of points on the road surface relative to one another. The computer program product where at least some of the pointcloud data is wirelessly received from an external device. The computer program product where the pointcloud data is wirelessly receives via a message communicated via Dedicated Short Range Communication. The computer program product where the external device is one or more of a roadside unit and a sharing vehicle. The computer program product where the plurality of elevation values is determined based at least in part on six-dimensional pose data of the vehicle. The computer program product where the six-dimensional pose data of the vehicle describes (1) a three-dimensional translation of the vehicle and (2) a three-dimensional rotation of the vehicle. Implementations of the described techniques may include hardware, a method or process, or computer software on a computer-accessible medium.

One general aspect includes a computer-implemented method including: determining a plurality of elevation values for a plurality of points on a road surface that are viewable by a driver when seated in a vehicle looking through a 3D HUD installed in the vehicle, where each elevation value is associated with a point from the plurality of points and describes the elevation of that point so that the plurality of points collectively describe a terrain for the road surface; associating each of the plurality of points with a different location of the 3D HUD so that the elevation of each point of the road surface is known; identifying a graphic for display on the 3D HUD, where the graphic is associated with at least one point from the plurality of points on the road surface; determining which location of the 3D HUD is associated with the at least one point associated with the graphic; and displaying the graphic at the location of the 3D HUD associated with the at least point in an orientation that is configured for the elevation of the point so that the graphic superposes the point when viewed by the driver when looking through the 3D HUD. Other embodiments of this aspect include corresponding computer systems, apparatus, and computer programs recorded on one or more computer storage devices, each configured to perform the actions of the methods.

Implementations may include one or more of the following features. The method where the plurality of elevation values is determined based at least in part on pointcloud data describing the road surface. The method where at least some of the pointcloud data is wirelessly received from an external device. The method where the plurality of elevation values is determined based at least in part on six-dimensional pose data of the vehicle. The method where the six-dimensional pose data of the vehicle describes (1) a three-dimensional translation of the vehicle and (2) a three-dimensional rotation of the vehicle. The method where associating each of the plurality of points with a different location of the 3D HUD so that the elevation of each point of the road surface is known further includes constructing an elevation grid that represents the road surface. The method where the elevation grid includes a plurality of cells that are each associated with one of the plurality of points of the road surface and each cell is assigned the elevation value for its associated point so that each cell has an elevation that corresponds to the elevation value for its associated point. The method where at least one of the elevation values are interpolated based on the elevation of a plurality of neighboring points in the elevation grid. Implementations of the described techniques may include hardware, a method or process, or computer software on a computer-accessible medium.

One general aspect includes a system including: a 3D HUD installed in a vehicle; and a memory storing instructions that, when executed, cause the system to: determine a plurality of elevation values for a plurality of points on a road surface that are viewable by a driver when seated in a vehicle looking through a 3D HUD installed in the vehicle, where each elevation value is associated with a point from the plurality of points and describes the elevation of that point so that the plurality of points collectively describe a terrain for the road surface; associate each of the plurality of points with a different location of the 3D HUD so that the elevation of each point of the road surface is known; identify a graphic for display on the 3D HUD, where the graphic is associated with at least one point from the plurality of points on the road surface; determine which location of the 3D HUD is associated with the at least one point associated with the graphic; and display the graphic at the location of the 3D HUD associated with the at least point so that the graphic superposes the point when viewed by the driver when looking through the 3D HUD. Other embodiments of this aspect include corresponding computer systems, apparatus, and computer programs recorded on one or more computer storage devices, each configured to perform the actions of the methods.

Implementations may include one or more of the following features. The system where the plurality of elevation values is determined based on pointcloud data describing the road surface and six-dimensional pose data describing the vehicle. The system where the graphic visually depicts which direction the vehicle should turn. The system where the graphic is a three-dimensional graphic. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

A ground adjustment application may be an element of a vehicle that includes a 3D HUD.

Figure 1A:
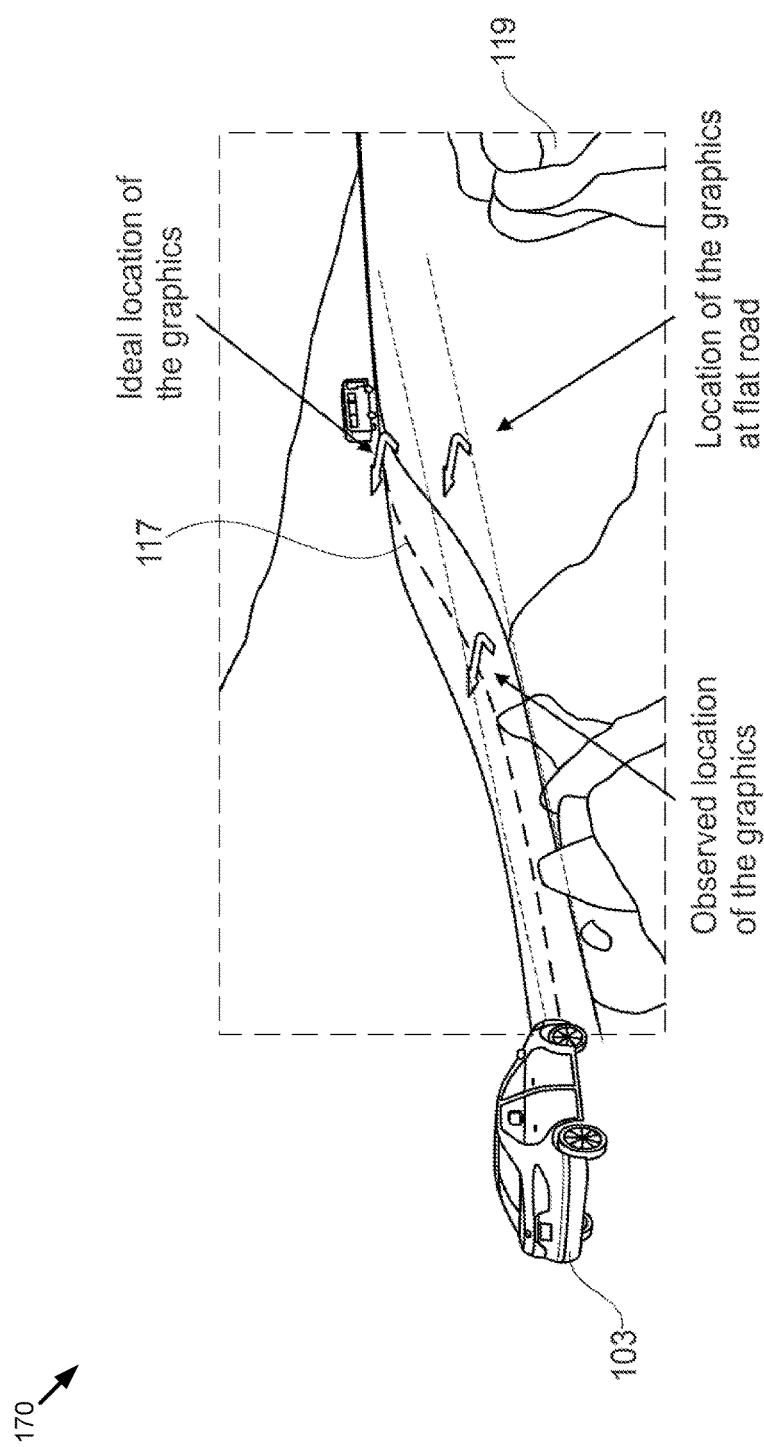
FIG. 1A is a graphic representation, according to some implementations, of graphics displayed on a HUD when the terrain or unevenness of the road surface are not taken into account.

FIG. 1A is a graphic representation 170, according to some implementations, of graphics displayed on a HUD when the terrain or unevenness of the road are not taken into account.

A vehicle 103 including a 3D HUD is driving on a road 117. On either side of the road is an off-road area 119. The terrain of the road 117 is variable. For example, the road curves and has variations in elevation at different points. The terrain for the off-road area 119 is also variable. For example, the terrain of the off-road areas 119 has a slope as the road 117 appears to have been built on a hillside. The 3D HUD displays graphics that are intended to assist the driver to navigate the road. The graphics are intended to superpose the road surface when the driver views the road surface by looking through the 3D HUD of the vehicle 103. However, because of the variation in the terrain for the road 117 and the off-road area 119, the 3D HUD is unable to display the graphics at a location in the 3D HUD that is consistent with the terrain of the road surface in the real world, and so, the graphics displayed by the 3D HUD do not superpose the road surface when the driver views them by looking through the 3D HUD. The ground adjustment application described herein beneficially solves this problem.

Figure 1B:
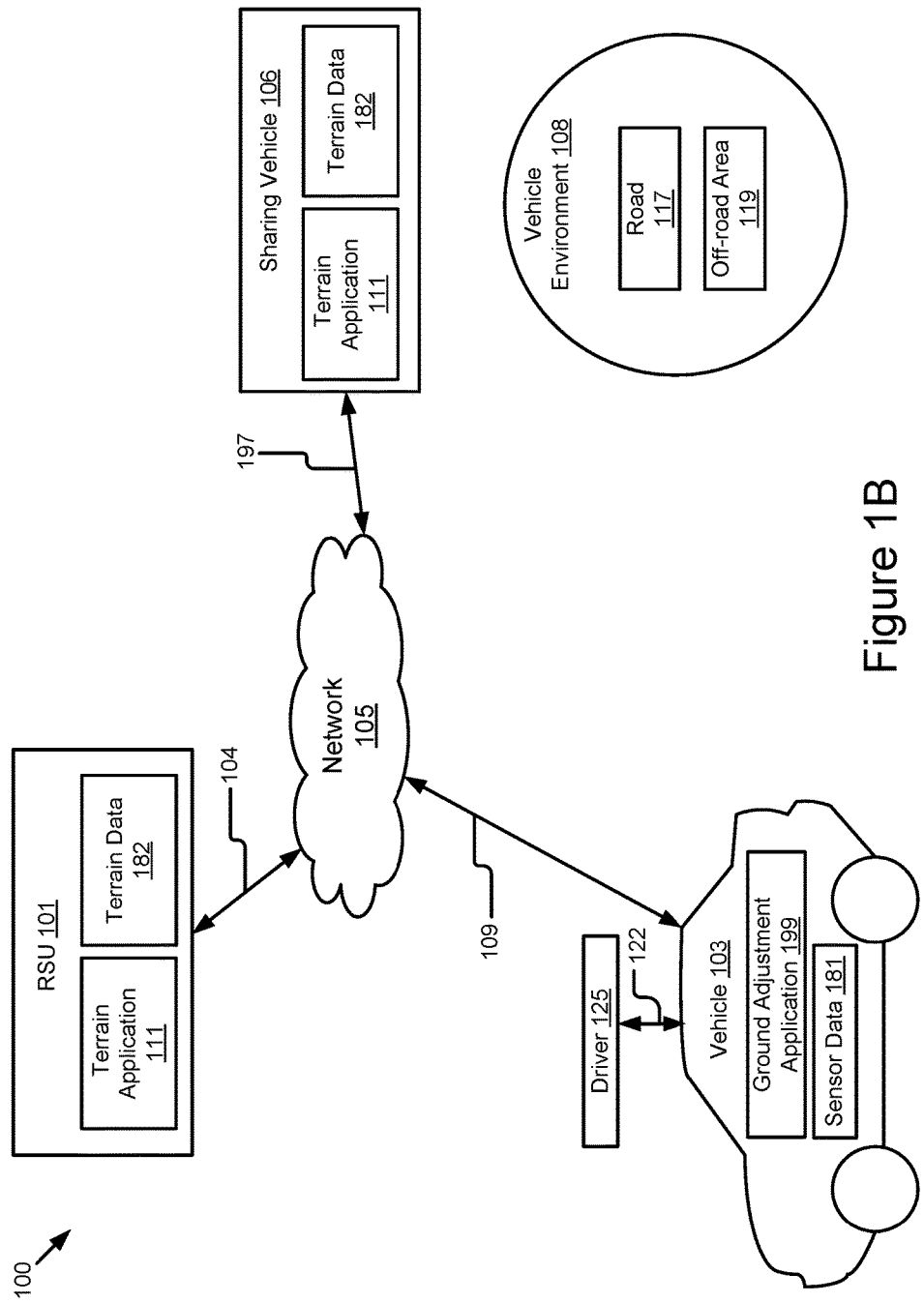
FIG. 1B is a block diagram illustrating an example operating environment for a ground adjustment application according to some implementations.

FIG. 1B is a block diagram illustrating an example operating environment 100 for a ground adjustment application 199 and a terrain application 111.

The operating environment 100 may include one or more of the following: a roadside unit 101 ("RSU" or "RSU 101" if singular, "RSUs" or "RSUs 101" if plural); a sharing vehicle 106; and a vehicle 103. In the illustrated implementation, these entities of the operating environment 100 may be communicatively coupled via a network 105. The operating environment 100 may include other servers or devices not shown in FIG. 1A including, for example, a traffic server for providing traffic data, a weather server for providing weather data, and a map server for providing map data, etc.

The vehicle 103 may be accessed by a driver 125 via a signal line 122. For example, the signal line 122 may represent one or more of a steering wheel and some other vehicle input device (e.g., a transmission, a gas pedal, a brake pedal, a head unit, a button, a switch, a sensor, etc.) which the driver 125 uses to control the vehicle 103 or provide an input to the vehicle 103.

In some implementations, the vehicle 103 may be located in a vehicle environment 108. The vehicle environment 108 may include a portion of the physical world (or "real world") where the vehicle 103 is located. The vehicle environment 108 may include one or more of the following: the vehicle 103; the RSU 101; the sharing vehicle 106; a road 117; and an off-road area 119.

The road 117 may include a conventional roadway. The road 117 may include a road surface, markers painted on the road surface, traffic signs, traffic lights and roadside equipment. There may be a plurality of roads 117 included in the vehicle environment 108.

The off-road area 119 may include a portion of the vehicle environment 108 that is not part of the road 117. For example, the off-road area 119 may include an unpaved portion of the vehicle environment 108. In some implementations, the off-road area 119 may include any portion of the vehicle environment 108 that is not the road 117. In some implementations, the off-road area 119 may include any portion of the vehicle environment 108 where it is not legal to drive the vehicle 103.

The vehicle 103, the sharing vehicle 106, the RSU 101 and the vehicle environment 108 in FIG. 1A can be used by way of example. While FIG. 1A illustrates one vehicle 103, one sharing vehicle 106, one RSU 101 and one vehicle environment 108, the disclosure applies to a system architecture having one or more vehicles 103, one or more sharing vehicles 106, one or more RSUs 101 and one or more vehicle environments 108. Furthermore, although FIG. 1A illustrates one network 105 coupled to the vehicle 103, the sharing vehicle 106 and the RSU 101, bit in practice one or more networks 105 can be connected to these entities.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, wireless application protocol (WAP), e-mail, DSRC, etc. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks.

In some implementations, the network 105 may include one or more communication channels shared among the vehicle 103 and one or more other wireless communication devices. The communication channel may include DSRC or any other wireless communication protocol. For example, the network 105 may be used to transmit a DSRC message, DSRC probe or basic safety message to a vehicle 103. In some implementations, the network 105 includes communication channels for sending and receiving data via full-duplex wireless communication as described in U.S. patent application Ser. No. 14/471,387 filed on Aug. 28, 2014 and entitled "Full-Duplex Coordination System," the entirety of which is hereby incorporated by reference.

The RSU 101 may be communicatively coupled to the network 105 via a signal line 104. The sharing vehicle 106 may be communicatively coupled to the network 105 via a signal line 197. The vehicle 103 may be communicatively coupled to the network 105 via a signal line 109.

In some implementations, the operating environment 100 may include a GPS satellite for providing GPS location data to the vehicle 103 or the sharing vehicle 106 that describes the geographic location of the vehicle 103 or the sharing vehicle 106, respectively. For example, the vehicle 103 may include a GPS unit that includes hardware to send and receive data from the GPS satellite. The GPS unit of the vehicle 103 may include a DSRC-compliant GPS unit that is accurate to within plus or minus 3 meters when the vehicle 103 is located under an open sky.

The vehicle 103 may include a car, a truck, a sports utility vehicle, a bus, a semi-truck, a drone or any other roadway-based conveyance that includes a 3D HUD. In some implementations, the vehicle 103 may include an autonomous vehicle or a semi-autonomous vehicle.

In some implementations, the vehicle 103 may include one or more of the following elements: a 3D HUD; a processor; a non-transitory memory; a communication unit; a sensor set; and a ground adjustment application 199. The processor may be an element of an onboard vehicle computer, an electronic control unit, a head unit, the 3D HUD or some other processor-based computing device.

The 3D HUD may be described in U.S. patent application Ser. No. 15/080,433 filed on Mar. 24, 2016 and entitled "Wireless Data Sharing Between a Mobile Client Device and a Three-Dimensional Heads-Up Display Unit," the entirety of which is herein incorporated by reference. An example implementation of the 3D HUD is described in more detail below with reference to FIG. 2B.

The processor, the non-transitory memory, communication unit and sensor set may include similar functionality as the processor 225, the memory 227, the communication unit 245 and the sensor set 212, respectively, which are described below with reference to FIG. 2A.

In some implementations, the sensor set may include one or more sensors. The one or more sensors may be operable to measure the vehicle environment 108. For example, the sensor set record one or more physical characteristics of the vehicle environment 108. The one or more physical characteristics may be recorded directly (e.g., atmospheric pressure, elevation at different points in the vehicle environment 108, temperature, or any other parameters capable of direct measurement by a vehicle sensor) or indirectly (e.g., an image or sound recording that depicts or describes a physical characteristic of the vehicle environment 108 or an object or event present within the vehicle environment). The recordings of these physical characteristics of the vehicle environment 108 may be described by the sensor data 181.

In some implementations, the sensor set may include one or more sensors that are operable to measure the 3D translation of the vehicle 103 and the 3D rotation of the vehicle 103. For example, the sensor set may record sensor data 181 that describes a geographic location of the vehicle 103 at one or more points in time, a speed or acceleration of the vehicle 103 at one or more points in time, a three dimensional orientation of the vehicle 103 at one or more points in time, a yaw of the vehicle 103 at one or more points in time, a pitch of the vehicle 103 at one or more points in time, a roll of the vehicle 103 at one or more points in time and any other measurements that may be used to determine the 3D translation and the 3D rotation of the vehicle 103. The recordings describing the 3D translation and the 3D rotation of the vehicle 103, or other recordings from which this information may be calculated or inferred, is described by the sensor data 181.

In some implementations, the geographic location of the vehicle 103 at a given time may be compared to other measurements described above for the same time to determine the physical characteristics of the terrain at that particular geographic location.

In some implementations, the sensor set may include one or more of the following vehicle sensors: one or more external microphones; one or more internal microphones; one or more external cameras which may be mounted to the vehicle 103 to capture images of the vehicle environment 108; one or more internal cameras which may be mounted to the vehicle 103 to capture images of an inside the cabin of the vehicle 103; one or more stereoscopic cameras; one or more LIDAR sensors; one or more laser-based range finders; one or more laser altimeters; one or more navigation sensor (e.g., a global positioning system sensor of the DSRC-compliant GPS unit that is accurate to within 1.5 meters, as opposed to being accurate to within 10 meters as is the case for non-DSRC-compliant GPS units); one or more infrared detectors; one or more motion detectors; one or more thermostats; one or more sound detectors, one or more barometers; a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set may be operable to record sensor data 181. The sensor data 181 may describe the recordings of the sensor set. In some implementations, the sensor data 181 may describe one or more of the following: the elevations of different points in the vehicle environment 108 (or other data from which this information may be calculated or inferred); the 3D translation of the vehicle 103 (or other data from which this information may be calculated or inferred); the 3D rotation of the vehicle 103 over time (or other data from which this information may be calculated or inferred); a location of the vehicle 103 at one or more different times (e.g., as indicated by time stamps associated with the sensor data 181 that describes the location of the vehicle 103); a location of the road 117; a location of the off-road area 119; a distance or range separating the vehicle 103 from one or more points in the vehicle environment 108 and an elevation change from the vehicle 103 to that point in the vehicle environment 108 (so that if the elevation of the vehicle 103 is known, then the elevation that that point in the vehicle environment 108 may be determined by adding or subtracting to the known elevation of the vehicle 103); one or more colors of objects in the vehicle environment 108; one or more images of the vehicle environment 108, objects in the vehicle environment 108 or areas in the vehicle environment 108 (e.g., the road 117 or the off-road area 119); and one or more images of any other features or elements of the vehicle environment 108.

In some implementations, the sensor data 181 may include recordings of any physical characteristic which may be used to determine one or more of the pointcloud data and the 6D pose data described herein.

The ground adjustment application 199 may include code and routines that are stored on the non-transitory memory of the vehicle 103 and accessible and executable by the processor of the vehicle 103.

In some implementations, the ground adjustment application 199 may control the operation of the 3D HUD. For example, the ground adjustment application 199 may include code and routines that, when executed by the processor of the vehicle 103, cause the 3D HUD to generate graphics that are displayed at a portion of the 3D HUD that is specified by the ground adjustment application 199.

The ground adjustment application 199 may generate the elevation grids described below with reference to FIGS. 1D and 1E. In FIG. 1E, the elevation grid may be associated with the 3D HUD so that the 3D HUD may display graphics at a location which corresponds to the terrain of the road surface that actually exists in the real world. In other words, the graphic superpose a portion of the terrain that is described by the graphic.

In some implementations, the ground adjustment application 199 may include code and routines that, when executed by a processor of the vehicle 103, causes the processor to execute one or more of the steps described below with reference to method 300 depicted in FIGS. 3A-3C.

In some implementations, the ground adjustment application 199 can be implemented using hardware including a field-programmable gate array ("FPGA") or an application-specific integrated circuit ("ASIC"). In some other implementations, the ground adjustment application 199 can be implemented using a combination of hardware and software. The ground adjustment application 199 may be stored in a combination of the devices and servers, or in one of the devices or servers.

The sensor data 181 may include any data necessary for the ground adjustment application 199 to provide its functionality.

The ground adjustment application 199 is described in more detail below with reference to FIG. 2A.

The sharing vehicle 106 includes similar functionality as the vehicle 103, and so, that description will not be repeated here. In some implementations, the sharing vehicle 106 may include one or more of the following elements: a 3D HUD; a processor; a non-transitory memory; a communication unit; and a sensor set. These elements of the sharing vehicle 106 are similar to those described above for the vehicle 103, and so, those descriptions will not be repeated here.

The sharing vehicle 106 also includes a terrain application 111. The sensor set of the sharing vehicle 106 may collect sensor data 181 which is stored on the non-transitory memory of the sharing vehicle 106. The sensor data 181 may describe, for example, the terrain of the vehicle environment 108 which is viewable by the driver 125 of the vehicle 103 when looking through the 3D HUD of the vehicle 103. The sensor data 181 of the sharing vehicle 106 may be out of sensor range for the sensor set included in the vehicle 103. The terrain application 111 may generate a wireless message that includes the sensor data 181 or a portion of the sensor data 181. The terrain application 111 may cause the communication unit of the sharing vehicle 106 to transmit the wireless message to the network 105. The communication unit of the vehicle 103 may receive the wireless message from the network 105. In this way, the terrain application 111 beneficially enables the ground adjustment application 199 of the vehicle 103 to provide its functionality using sensor data 181 which is sourced, in whole or in part, from a remote source such as the sharing vehicle 106 (or as described below, the RSU 101).

In some implementations, the terrain application 111 can be implemented using hardware including an FPGA or an ASIC. In some other implementations, the terrain application 111 can be implemented using a combination of hardware and software. The terrain application 111 may be stored in a combination of the devices and servers, or in one of the devices or servers.

The terrain application 111 is described in more detail below with reference to FIG. 2C.

The RSU 101 is a roadside service unit. In some implementations, the RSU 101 may include one or more of the following elements: a processor; a non-transitory memory; a communication unit; and a sensor set. These elements of the RSU 101 are similar to those described above for the vehicle 103, and so, those descriptions will not be repeated here.

The RSU 101 may also include a terrain application 111. The sensor set of the RSU 101 may collect sensor data 181 and the terrain application 111 may cause a processor of the RSU 101 to share the sensor data 181 with the ground adjustment application 199 of the vehicle 103. The terrain application 111 of the RSU 101 is similar to the terrain application 111 described above for the sharing vehicle 106, and so, that description will not be repeated here.

Figure 1C:
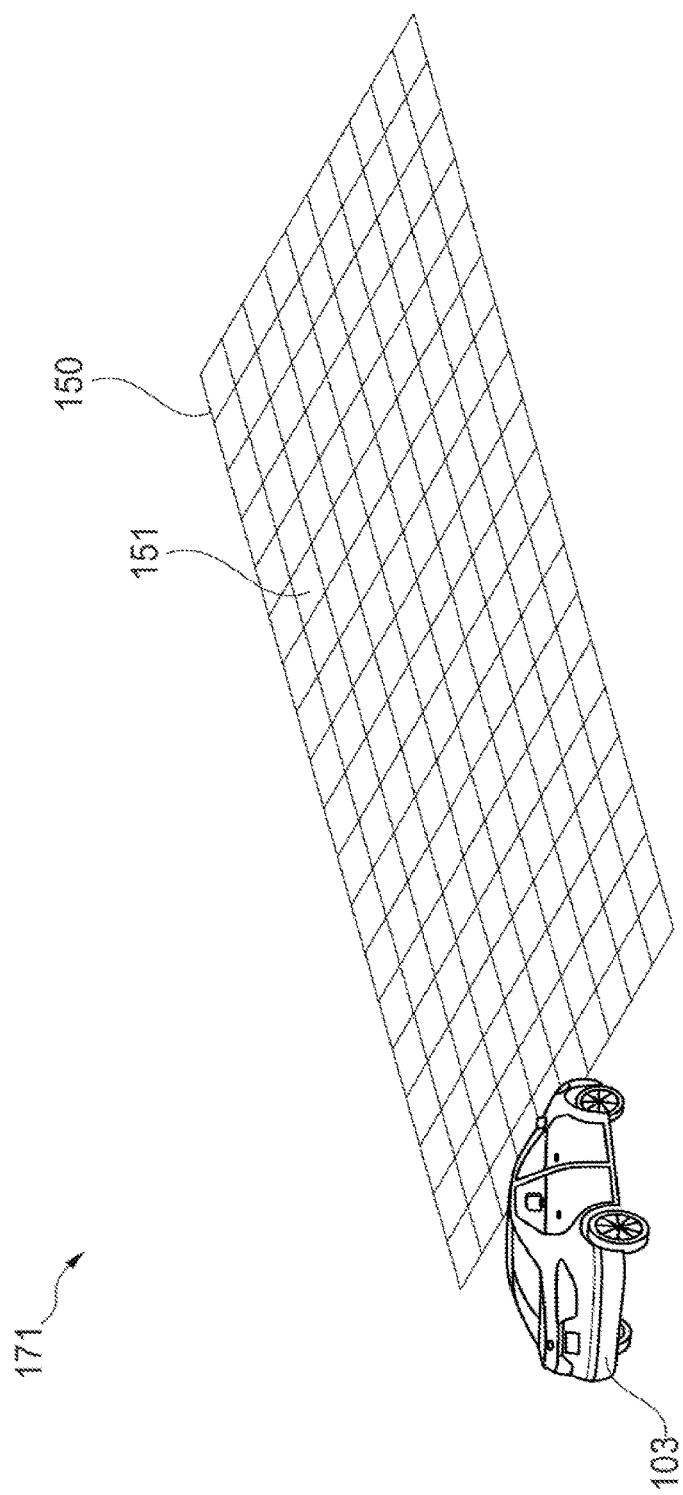
FIG. 1C is a graphic representation, according to some implementations, of a flat elevation grid.

Referring now to FIG. 1C, depicted is a graphic representation 171, according to some implementations, of a flat elevation grid 150.

In some implementations, the elevation grid 150 is a grid data structure that represents the portion of the road surface present in the real world (e.g., the vehicle environment 108) which the driver 125 sees when looking through a 3D HUD of the vehicle 103. The elevation grid 150 may be generated by the ground adjustment application 199. The size of the elevation grid 150 may depend on the range of the vehicle sensors included in the sensor set. The size of the elevation grid 150 may be increased, for example, by one or more of the sharing vehicle 106 and the RSU 101 providing sensor data 181 to the vehicle 103. In this way the terrain application 111 beneficially improves the performance of the ground adjustment application 199.

In some implementations, the elevation grid 150 is initially flat and includes a plurality of cells 151. Each of the cells 151 may represent or be associated with a portion of the vehicle environment 108 which the driver 125 sees when seated in the vehicle 103 and looking through the 3D HUD of the vehicle 103. In this way, the elevation grid 150 is a grid data structure that represents, in a digital world, the portion of the vehicle environment 108 (in the real world) which the driver 125 sees when seated in the vehicle 103 and looking through the 3D HUD of the vehicle 103.

The ground adjustment application 199 may analyze the sensor data 181 to determine surface elevation data. The surface elevation data may describe the elevations for different points of road surface which are viewable by the driver when they are seated in the vehicle 103 and look through the 3D HUD. Each of the cells 151 may be assigned an elevation value (based on, e.g., the surface elevation data) which affects or defines the elevation of that cell. For example, each point of the road surface has a certain elevation. This elevation may be described by the sensor data 181, and in turn the surface elevation data. Some or all of the points of the road surface are associated with a different cell 151 of the elevation grid 150. Each cell 151 is assigned the elevation value for the point in the real world which it represents. This process may be repeated for each cell so that the elevation grid accurately represents the terrain of the portion of the road surface which the driver sees when looking through the 3D HUD. The elevation grid 150 is initially flat because each of the cells 151 is initially assigned an elevation value of zero.

Figure 1D:
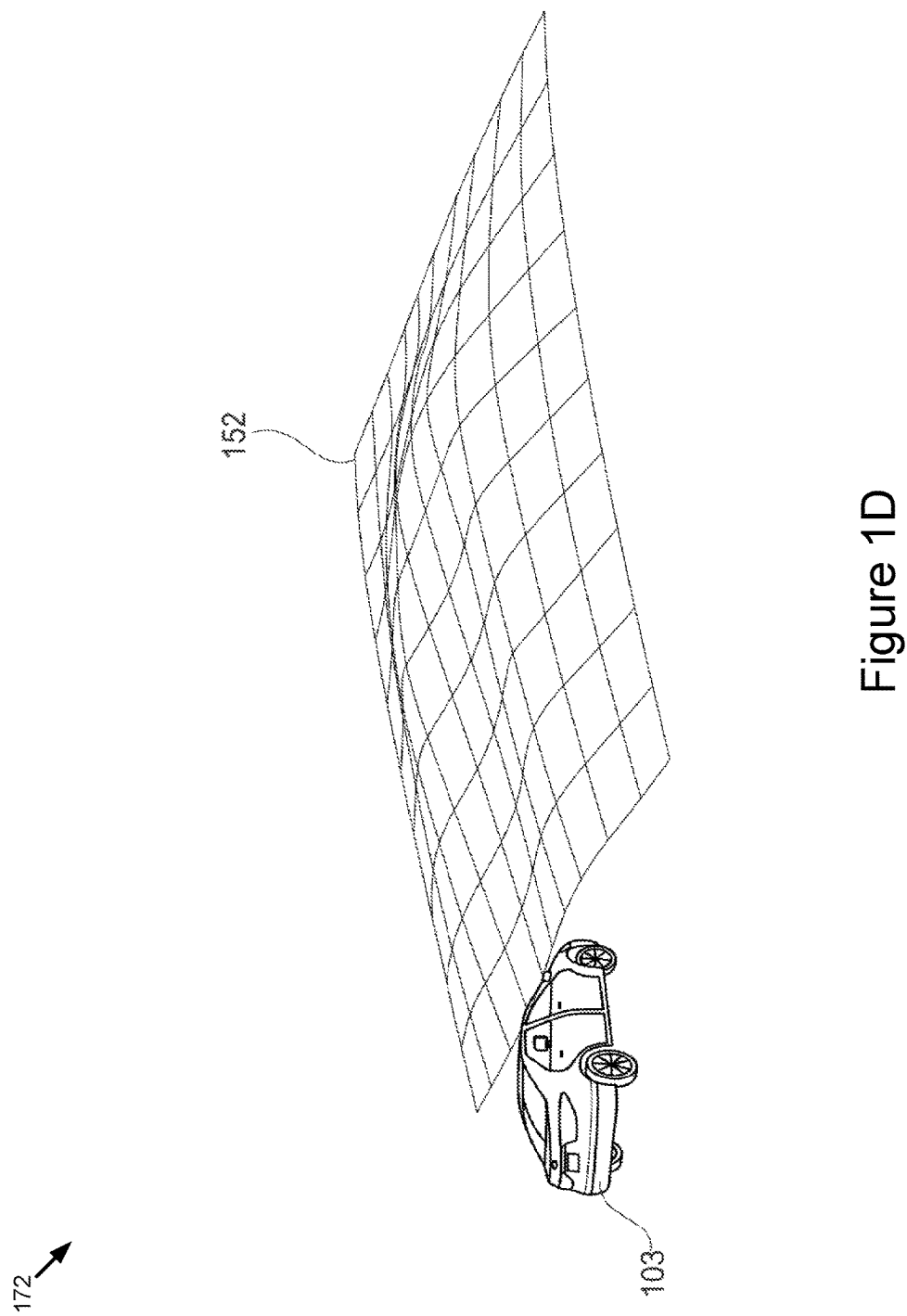
FIG. 1D is a graphic representation, according to some implementations, of an elevation grid whose cells are assigned elevation values.
Figure 1E:
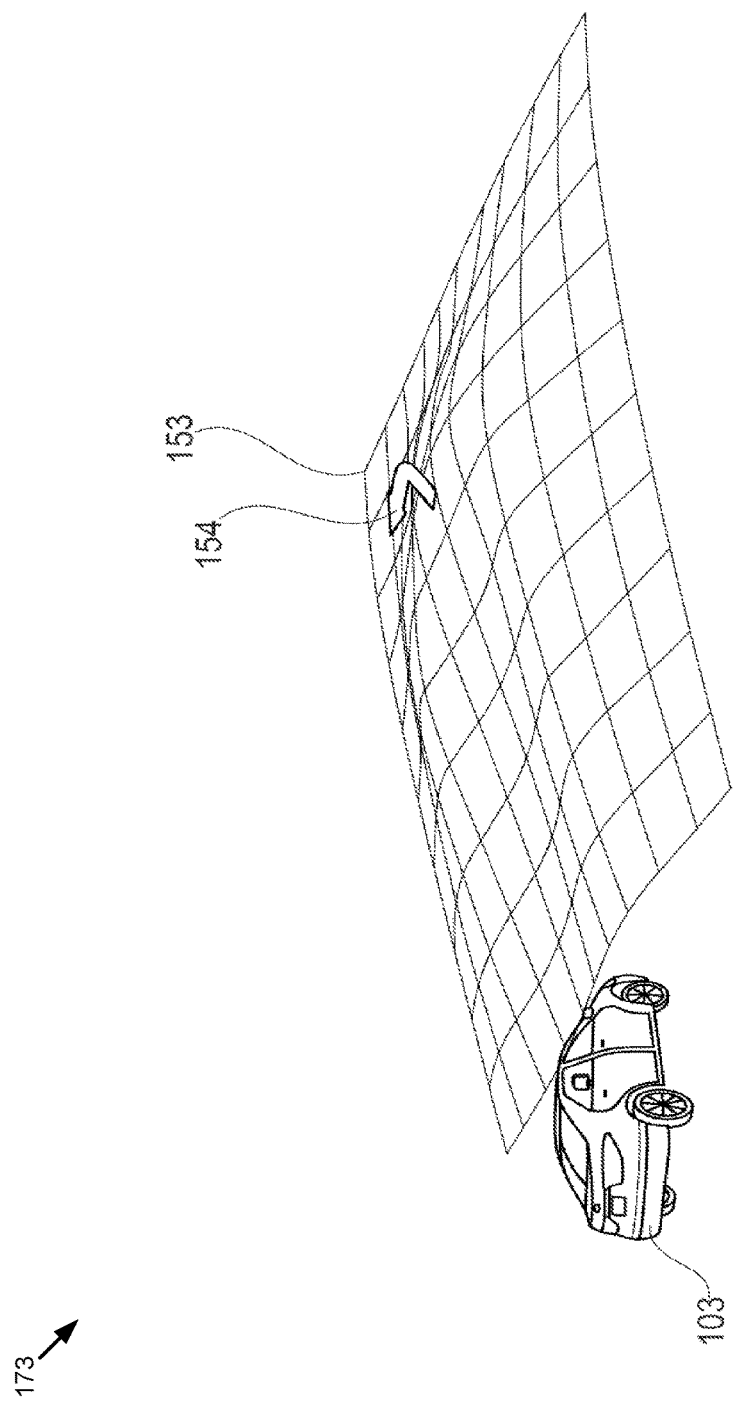
FIG. 1E is a graphic representation, according to some implementations, of an elevation grid associated with a 3D HUD projecting a graphic at a location that is adjusted for the terrain of the road surface so that the graphic superposes a portion of the terrain described by the graphic.

Referring now to FIG. 1D, depicted is a graphic representation 172, according to some implementations, of an elevation grid 152 whose cells are assigned elevation values.

Referring now to FIG. 1E, depicted is a graphic representation 173, according to some implementations, of an elevation grid 153 associated with a 3D HUD projecting a graphic 154 at a location that is adjusted for the terrain of the road surface so that the graphic superposes a portion of the terrain described by the graphic. For example, the driver of the vehicle 103 would look through the 3D HUD and see the graphic 154 displayed at a location in the 3D HUD that corresponds to the actual terrain of the vehicle environment.

Example Systems

Figure 2A:
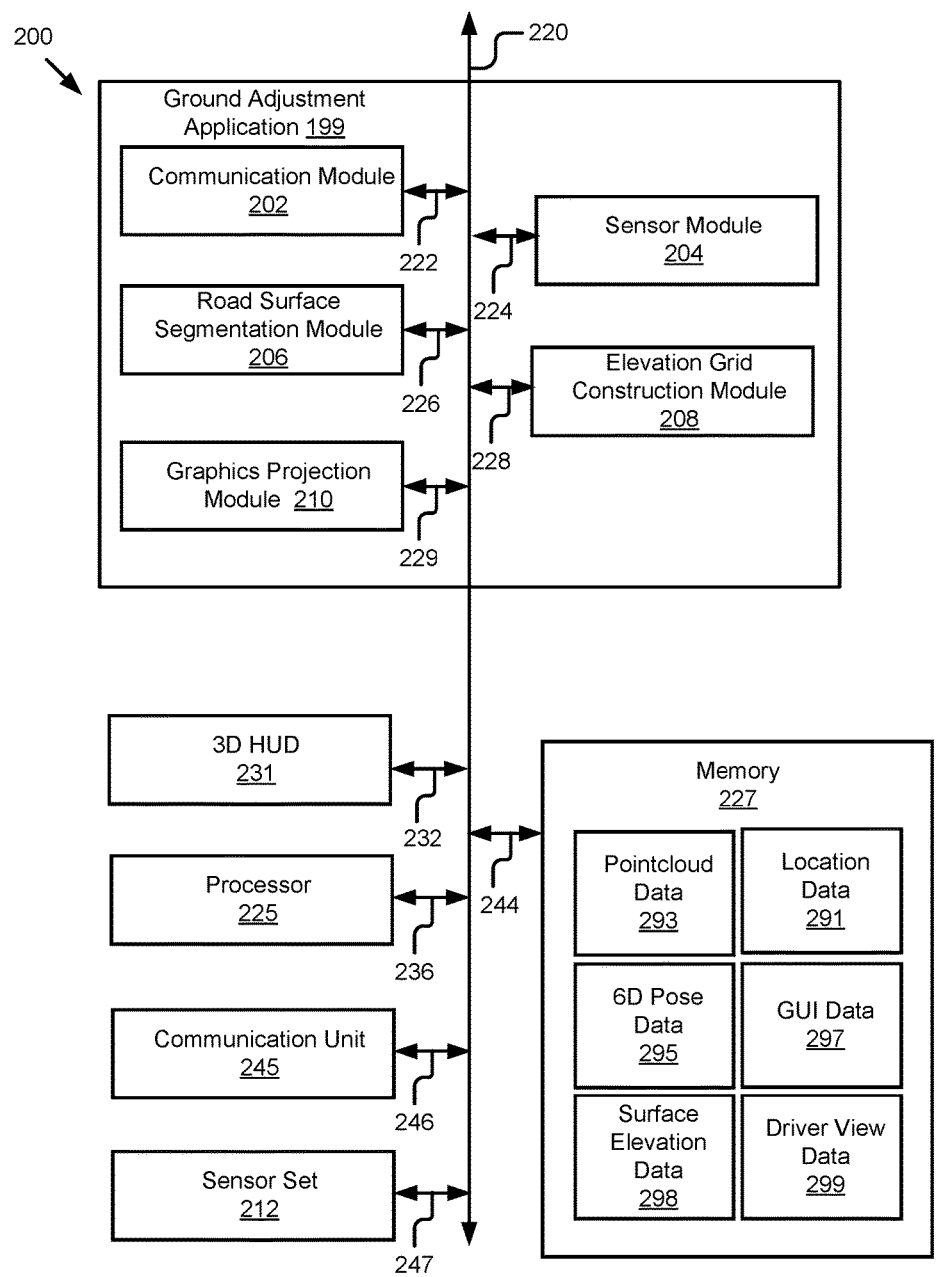
FIG. 2A is a block diagram illustrating an example computer system including a ground adjustment application according to some implementations.

Referring now to FIG. 2A, an example of a computer system 200 including the ground adjustment application 199 is depicted.

FIG. 2A is a block diagram of a computer system 200 that includes the ground adjustment application 199, a processor 225, a memory 227, a 3D HUD 231, a sensor set 212 and a communication unit 245, according to some examples. The components of the computer system 200 are communicatively coupled by a bus 220. In some implementations, the computer system 200 can be the vehicle 103.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 236. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors 225 may be included. The processor 225 may include a GPU. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2A, the memory 227 stores one or more of the following: location data 291; pointcloud data 291; 6D pose data 295; surface elevation data 298; GUI data 297; and driver view data 299.

The pointcloud data 293 may describe the portion of the vehicle environment which is viewable by the driver when the driver is seated in the vehicle and looking through the 3D HUD 231. The pointcloud data 293 may identify one or more points within this vehicle environment and one or more elevations associated with these points.

In some implementations, the pointcloud data 293 may include a set of data points in some coordinate system. In a three-dimensional coordinate system, these points may be defined Cartesian X, Y, Z coordinates. In some implementations, the pointcloud data 293 may represent the external surface of the portion of the vehicle environment which is viewable by the driver when seated in the vehicle and looking through the 3D HUD 231.

In some implementations, the pointcloud data 293 may be measured by one or more 3D scanners, LIDAR sensors, laser-based range finders, stereoscopic cameras or other sensors included in the sensor set 212. These sensors may measure a plurality of points on the surface of the vehicle environment. The pointcloud data 293 may describe a pointcloud that represents the set of points measured by these sensors.

In some implementations, the pointcloud data 293 may include a data structure having two columns: a first column; and a second column. The first column may include a plurality of identifiers, each of which may be unique, for a plurality of points (e.g., geographic locations) within the vehicle environment. The second column may include a plurality of elevation values associated with and describing each of the points. For example, a first identifier for a first point in the first column may be associated with a first elevation value included in the second column, where the second range value describes the elevation of the second point above some known constant (e.g., sea level, or any other constant whose value is known or customary). The first column may include a plurality of such identifiers and elevation values associated with the identifiers. As described below, when an elevation value for a point is not known for some reason, this value may be interpolated by the ground adjustment application 199 using the elevation values of neighboring (or adjacent) points.

The identifier included in the pointcloud data 293 may include a Cartesian identifier such as a point identified by an X, Y, Z coordinate. In some implementations the identifier may include data similar to the location data 291 such as a GPS coordinate describing a point in the vehicle environment.

In some implementations, an identifier and its associated elevation value may be determined by the ground adjustment application 199, for example, by identifying the location of the vehicle (e.g., as indicated by the location data 291) and then determining a range (which may be described by a three-dimensional X, Y, Z coordinate relative to the vehicle) separating the vehicle from the point. This range may be determined, for example, using one or more of the following: a LIDAR sensor; one or stereoscopic cameras; and a laser-based range sensor. Once the range from the vehicle to the point is known, the location of the point (which may also be the identifier for the point) may be determined relative to the known location of the vehicle. The location of the vehicle may be described, for example, by the location data 291. The location data 291 may include the GPS coordinate (e.g., location) of the vehicle as received by a GPS unit or navigation sensor, either of which may be DSRC-compliant, that is included in the sensor set 212. As the location data 291 may be DSRC-compliant, it may describe the location of the vehicle to within plus or minus three meters of the actual location of the vehicle which, taken together with LIDAR-based range information, identifies or describes the location of the point in the vehicle environment with accuracy that is approximately accurate to within plus or minus three meters (since LIDAR is essentially perfectly accurate). Moreover, as the location data 291 may also be GPS-based, the location data 291 may also describe the elevation of the vehicle. This elevation information for the vehicle may be combined with the vertical component of the range information describing the range between the vehicle and the point in the vehicle environment to determine the absolute elevation for the point (e.g., by combining the elevation of the vehicle and the elevation of the point relative to the vehicle), which may then be determined by the ground adjustment application 199 to be the elevation value for the point which is included in the second column and associated with the identifier for the point in the first column of the pointcloud data 293. Alternatively, the evaluation value for the point included in the second column may be determined by the ground adjustment application 199 to be the elevation of the point relative to the vehicle since this delta may be sufficient to orient a graphic in the 3D HUD 231 relative the vehicle environment as viewed by the driver of the vehicle when looking through the 3D HUD 231.

The 6D pose data 295 may describe (1) the 3D translation of the vehicle and (2) the 3D rotation of the vehicle. The 6D pose data may also describe aspects or features of the vehicle environment. The 3D translation of the vehicle may be indicated, for example, by location data 291 over a period of time such that the GPS-based location of the vehicle is tracked over a plurality of points in time to indicate the 3D translation of the vehicle. The 3D translation of the vehicle may also be indicated by a combination of the velocity of the vehicle as well as other sensor data sourced from accelerometers, gyroscopes and other sensors of the sensor set 212. The 3D rotation of the vehicle may also be indicated by the accelerometers, gyroscopes and other sensors of the sensor set 212.

In some implementations, the ground adjustment application 199 may use the 6D pose data 295 of the vehicle to determine how to orient the graphics which are displayed in the 3D HUD 231 of the vehicle. For example, the 6D pose data 295 may indicate the orientation of the vehicle, the driver or the road surface upon which the vehicle is traveling, and this orientation information may affect how the graphic should be displayed in the 3D HUD 231 to achieve the outcome depicted in FIG. 1E versus the undesirable outcome depicted in FIG. 1A.

In some implementations, the ground adjustment application 199 may use the 6D pose data 295 to estimate or infer the elevations of different points of the road surface which is viewable by the driver when seated in the vehicle and looking through the 3D HUD 231.

The surface elevation data 298 may describe the elevations for different points on the road surface which are viewable by the driver when they look through the 3D HUD 231.

Although not depicted in FIG. 2A, the memory 227 may store data that describes the elevation grid (e.g., grid data describing the elevation grid).

In some implementations, the memory 227 may store driver view data 299. The driver view data 299 may include sensor data captured by one or more internal sensors of the sensor set 212. The driver view data 299 may describe the driver. The driver view data 299 may describe, among other things, the eye orientation of the driver relative to the 3D HUD 231. The driver view data 299 may describe what the driver sees when looking through the 3D HUD 231. The driver view data 299 may include any data necessary for the ground adjustment application 199 to determine one or more Cartesian coordinates (mapped to the 3D HUD 231, for example, where one of the corners of the 3D HUD 231 is the origin of the coordinate system) used to determine where to display graphics on the 3D HUD 231 relative to the vision of the driver.

The GUI data 297 may include graphical data used to generate graphics for display on the 3D HUD 231. For example, the GUI data 297 may include graphical data used to generate one or more of the graphics depicted in FIG. 1E. This example is not intended to be limiting. In some implementations, the graphic may be a three-dimensional graphic. The graphic may depict which direction the vehicle should turn, for example, based on a set of navigation instruction provided by a navigation system included in the vehicle.

In some implementations, the memory 227 may store the sensor data 181 described above with reference to FIG. 1B. For example, the following elements may be components of the sensor data 181: the location data 291; the pointcloud data 293; the 6D pose data 295; the surface elevation data 298; and the driver view data 299.

The 3D HUD 231 is described in more detail below with reference to FIG. 2B. The 3D HUD 231 may be communicatively coupled to the bus 220 via a signal line 232.

The sensor set 212 may include one or more of the following vehicle sensors: an external microphone; an internal microphone; an external camera; an internal camera; a LIDAR sensor; a laser-based range finder; a laser altimeter; one or more stereoscopic cameras; a navigation sensor (e.g., a global positioning system sensor of the DSRC-compliant GPS unit that is accurate to within 1.5 meters, as opposed to being accurate to within 10 meters as is the case for non-DSRC-compliant GPS units); an infrared detector; a motion detector; an accelerometer; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The sensor set 212 may include one or more of any type of the sensors listed above.

The sensor set 212 may be operable to record sensor data 181 that describes one or more of the following: the sensor data 181 described above with reference to FIG. 1B: the location data 291; the pointcloud data 293; the 6D pose data 295; the surface elevation data 298; the driver view data 299.

In some implementations, the sensor set 212 may include one or more digital cameras for capturing the images necessary to provide one or more of the following data sets: the location data 291; the pointcloud data 293; the 6D pose data 295; the surface elevation data 298; the driver view data 299. The one more cameras may capture images of what the driver sees when viewing the 3D HUD 231. In some implementations, the one images may include stereoscopic images for generating panoramas used to provide virtual reality content for display on the 3D HUD 231.

In some implementations, at least one of the cameras is a digital camera mounted to the interior of the vehicle 103 and configured to monitor the gaze of the driver 125 and determine which region of the 3D HUD 231 the driver 125 is viewing. For example, the interior camera records the driver's face and, in particular, the driver's eyes and their gaze relative to the 3D HUD 231. The camera may also record what the driver sees when looking at the 3D HUD 231 (e.g., the vehicle environment including the road surface upon which the vehicle is driving). There may be multiple types of internal cameras that capture different types of information relative to this scene. The internal camera may include a LIDAR or range finder used to determine a range or distance separating the driver's eyes (or a point in between the driver's eyes) and the portion of the 3D HUD 231 that corresponds to where a graphic may be displayed on the 3D HUD 231 based on the terrain that the driver sees when looking through the 3D HUD 231.

In some implementations, the sensor set 212 may be communicatively coupled to the bus 220 via a signal line 247.

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including: IEEE 802.11; IEEE 802.16, Bluetooth; EN ISO 14906:2004 Electronic Fee Collection—Application interface EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some implementations, the communication unit 245 may include a full-duplex coordination system as described in U.S. patent application Ser. No. 14/471,387 filed on Aug. 28, 2014 and entitled "Full-Duplex Coordination System."

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The communication unit 245 may be communicatively coupled to the bus 220 via a signal line 246.

The ground adjustment application 199 may comprise one or more of the following elements: a communication module 202; a sensor module 204; a road surface segmentation module 206; an elevation grid construction module 208; and a graphics projection module 210.

The communication module 202 is communicatively coupled to the bus 220 via a signal line 222. The sensor module 204 is communicatively coupled to the bus 220 via a signal line 224. The road surface segmentation module 206 is communicatively coupled to the bus 220 via a signal line 226. The elevation grid construction module 208 is communicatively coupled to the bus 220 via a signal line 228. The graphics projection module 210 is communicatively coupled to the bus 220 via a signal line 229.

The communication module 202 can be software including routines for handling communications between the ground adjustment application 199 and other components of the computer system 200. In some implementations, the communication module 202 can be a set of instructions executable by the processor 225 to provide the functionality described below for handling communications between the ground adjustment application 199 and other components of the computer system 200. In some implementations, the communication module 202 can be stored in the memory 227 of the computer system 200 and can be accessible and executable by the processor 225.

The communication module 202 receives data and transfers the data, via the communication unit 245, to the other components of the operating environment 100. For example, the communication module 202 may receive sensor data from the network 105.

The communication module 202 receives data and transfers the data to the other components of the computer system 200. For example, the communication module 202 may provide GUI data 297 to the graphics projection module 210.

The communication module 202 may communicate with the network 105 via the communication unit 245. For example, the communication module 202 may receive a portion of the data stored on the memory 227 from the network 105.

The sensor module 204 can be software including routines for collector sensor data collected by the sensor set 212 that is used by the ground adjustment application 199 to provide its functionality. The sensor module 204 may control the operation of the sensor set 212. The sensor module 204 may organize the sensor data into different categories such as those depicted in FIG. 2A as being stored in the memory 227. In some implementations, the sensor module 204 can be stored in the memory 227 of the computer system 200 and can be accessible and executable by the processor 225.

The road surface segmentation module 206 can be software including routines for analyzing the pointcloud data 293 and the 6D pose data 295. The road surface segmentation module 206, when executed by the processor 225, may cause the processor 225 to remove all data points from the pointcloud data 293 and the 6D pose data 295 that do not describe the elevation of the road surface which the driver sees when seated in the vehicle and looking through the 3D HUD 231. The data resulting from this culling may be combined to form the surface elevation data 298. Distinction between the road surface and the other portions of the vehicle environment may be achieved by the road surface segmentation module 206 using object priors or other image recognition techniques. This surface elevation data 298 may describe the elevation of the road surface at different points along the road surface. The elevation of the road surface may change at different points, creating a varying terrain. In theory, the elevation of each discrete point in the road surface (which is viewable by the driver or within range of the sensors of the sensor set 212) may be described by the surface elevation data 298 so that the surface elevation data 298 may describe the terrain of the entire road surface which the driver sees when looking through the 3D HUD 231. In this way the road surface segmentation module 206 may generate the surface elevation data 298 based on the pointcloud data 293 and the 6D pose data 295.

In some implementations, the road surface segmentation module 206 can be stored in the memory 227 of the computer system 200 and can be accessible and executable by the processor 225.

The elevation grid construction module 208 can be software including routines for generating an elevation grid representing the road surface which the driver sees when seated in the vehicle and looking through the 3D HUD 231. The size of the elevation grid may depend on the range of the vehicle sensors included in the sensor set 212, which may in turn be enhanced by receipt of sensor data from external sources such as the sharing vehicle and the RSU. The elevation grid is initially flat (see, e.g., FIG. 1C) and includes a plurality of cells (see, e.g., element 151 of FIG. 1C). The elevation grid is initially flat because each of the cells is initially assigned an elevation value of zero. The elevation grid construction module 208 may assign an elevation value based on the surface elevation data 298 to each of the cells of the elevation grid, which in turn defines the elevation of that cell. This process may be repeated by the elevation grid construction module 208 for each cell so that the elevation grid accurately represents the terrain of the portion of the road surface which the driver sees when looking through the 3D HUD 231.

As mentioned above, the surface elevation data 298 may describe the elevations for different points on the road surface which are viewable by the driver when they look through the 3D HUD 231. The elevation grid includes a plurality of cells which may collectively include (or digitally represent) each of the points on the road surface which are viewable by the driver when they look through the 3D HUD 231. The elevation grid construction module 208 may analyze the surface elevation data 298 to determine an elevation value to assign to each cell of the elevation grid so that the elevation grid is no longer flat and accurately reflects the terrain of the road surface which is viewable by the driver when they look through the 3D HUD 231.

In practice, the surface elevation data 298 may not include data that describes the elevation for each point of the road surface that is viewable by the driver when looking through the 3D HUD 231. The elevation grid construction module 208 may identify each cell of the elevation grid having no elevation value assigned to it (e.g., because the surface elevation data 298 did not include sensor data describing the elevation for this point on the road surface). For each cell identified by the elevation grid construction module 208 as having no elevation assigned to it, the elevation grid construction module 208 may interpolate an elevation value for that cell based on the elevation values of the neighboring cells. In this way each cell of the elevation grid may be assigned an elevation value by the elevation grid construction module 208, thereby creating a realistic elevation grid, an example of which is depicted in FIG. 1D according to some implementations.

In some implementations, the elevation grid construction module 208 can be stored in the memory 227 of the computer system 200 and can be accessible and executable by the processor 225.

The graphics projection module 210 can be software including routines for using the elevation grid generated by the elevation grid construction module 208 to project graphics on the 3D HUD 231. For example, the communication module 202 may provide grid data to the graphics projection module 210 that describes the elevation grid constructed by the elevation grid construction module 208. The graphics projection module 210 may associate the elevation grid with the 3D HUD 231 so that different portions of the 3D HUD 231 are known to correspond to different points of the road surface in the real world (as represented by the plurality of cells of the elevation grid) and the elevation of the different points of the real world viewable by the driver when looking through the 3D HUD are known (see, e.g., FIG. 1E).

The graphics projection module 210 may project graphics onto the 3D HUD 231 using the GUI data 297. For each portion of a graphic to be depicted onto the 3D HUD 231, the graphics projection module 210 may determine which location in the real world is associated with the graphic and which cell or cells of the elevation grid correspond to that location. For example, if the graphic shows where the vehicle may turn left or right in a navigation route, then the graphics projection module 210 may associate the graphic with the point in the roadway where the vehicle may turn left or right. In this way the association is context specific relative to the function of the graphic. The graphics projection module 210 may project or display the graphic on the 3D HUD 231 at the cell or cells of the elevation grid that correspond to the location in the real world that is associated with the graphic (see, e.g., FIG. 1E).

In some implementations, the graphics projection module 210 may work with a GPU or some other processor of the vehicle (e.g., the processor 2250 to project the graphic on the 3D HUD 231. The graphics projection provided by the graphics projection module 210 may be performed in real time or substantially real time relative to events occurring the real world such as the translation of the vehicle.

In some implementations, the graphics projection module 210 may transform the driver view data 299 to data that describes the driver's eye position coordinates. This data may be used to assist in determining where to display the graphic on the 3D HUD 231. For example, the graphics projection module 210 may receive the driver view data 299 as an input and output a Cartesian coordinate that describes a location on the 3D HUD 231 where a graphic may be displayed based on the terrain of the road surface and the orientation of how the driver is viewing the 3D HUD 231. The driver view data 299 can be images from color or depth cameras, or distance information from laser or LIDAR sensors. In this way the graphics projection module 210 may determine how to position graphics on the 3D HUD relative to the vision of the driver.

In some implementations, the graphics projection module 210 may include software including routines for determining which region of the 3D HUD 231 the driver is viewing at a given time. For example, the sensor set 212 may include an internal camera that captures an image of the driver. The image may be oriented to enable the graphics projection module 210 to identify which region of the 3D HUD 231 the eyes of the driver are viewing at one or more times.

In some implementations, the graphics projection module 210 may continuously monitor which portion of the 3D HUD 231 the driver is viewing and cause the communication module 202 to continuously provide signals or sensor data that describes this information. For example, based on instruction by the graphics projection module 210, the communication module 202 may provide a signal or sensor data that includes a Cartesian coordinate describing which portion of the 3D HUD 231 the driver is viewing. In this way the graphics projection module 210 may determine, relative to the view of the driver, where a first graphic should be displayed on the 3D HUD 231 so that it overlays the terrain of the vehicle environment (as indicated by the elevation grid) correctly as indicated, for example, in FIG. 1E according to some implementations.

In some implementations, the graphics projection module 210 can be stored in the memory 227 of the computer system 200 and can be accessible and executable by the processor 225.

In some implementations, the computer system 200 may include one or more of the modules and/or data described in U.S. patent application Ser. No. 15/080,412 filed on Mar. 24, 2016 and entitled "Three Dimensional Graphical Overlays for a Three Dimensional Heads-up Display Unit of a Vehicle," the entirety of which is hereby incorporated by reference.

In some implementations, the computer system 200 may include one or more of the modules and/or data described in U.S. patent application Ser. No. 15/080,394 filed on Mar. 24, 2016 and entitled "Three Dimensional Heads-up Display Unit Including Visual Context for Voice Commands," the entirety of which is hereby incorporated by reference.

Figure 2B:
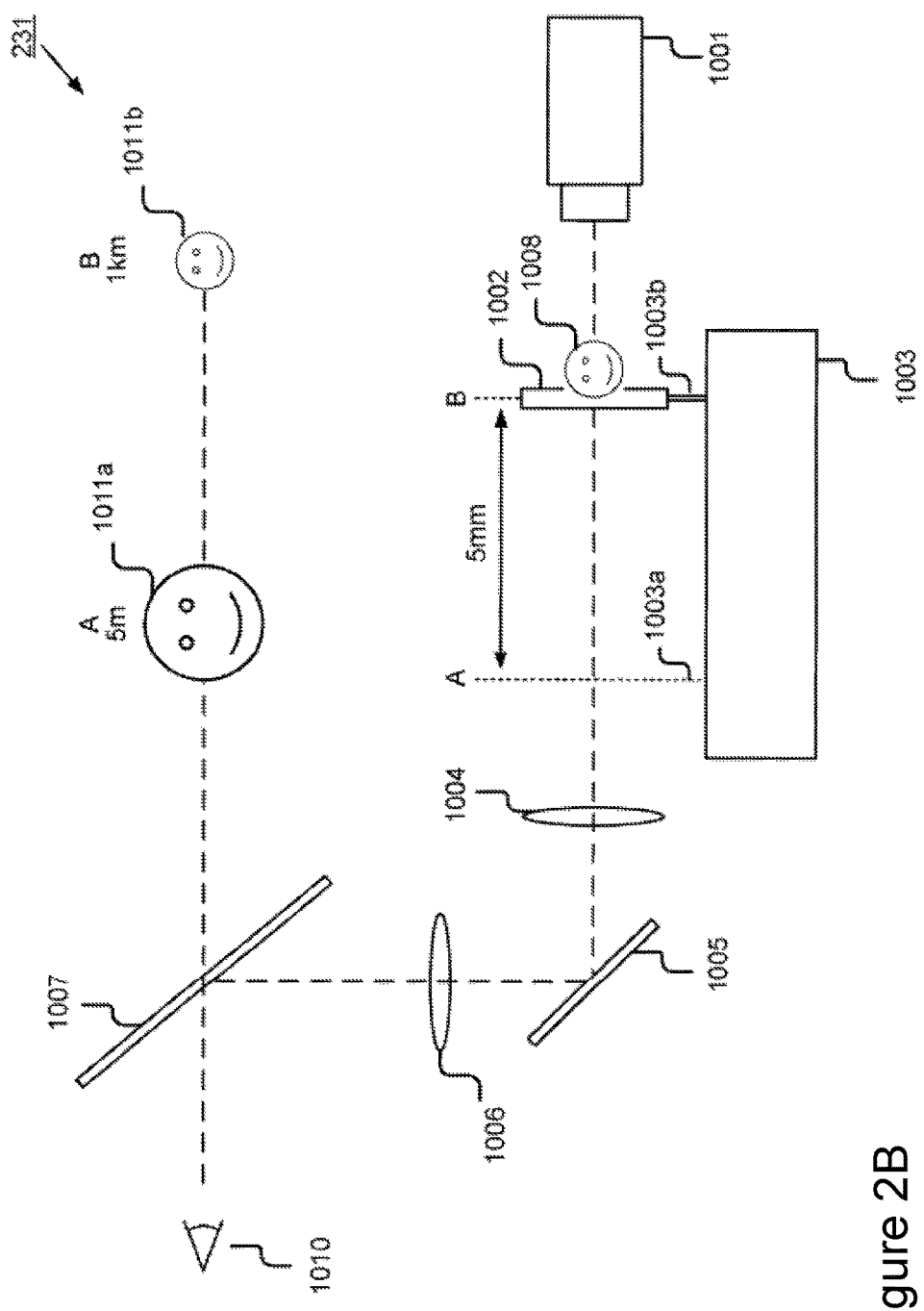
FIG. 2B is a block diagram illustrating an 3D HUD according to some implementations.

Referring to FIG. 2B, depicted is a block diagram illustrating an 3D HUD 231 according to some implementations.

In some implementations, the 3D HUD 231 includes a projector 1001, a movable screen 1002, a screen-driving unit 1003, an optical system (including lenses 1004, 1006, reflector 1005, etc.). The projector 1001 may be any kind of projector such as a digital mirror device (DMD) project, a liquid crystal projector. The projector 1001 projects an image (graphic) 1008 on the movable screen 1002. The movable screen 1002 includes a transparent plate and so the projected image lights transmit through the movable screen 1002 to be projected on the windshield 1007 of a vehicle (e.g., vehicle 103). The image projected on the windshield 1007 is perceived by a driver 1010 as if it is a real object (shown as 1011a, 1011b) that exists in the three-dimensional space of the real world, as opposed to an object that is projected on the windshield. In some implementations, the 3D HUD 231 is capable of controlling the direction of the image relative to the driver 1010 (in other words, the image position in the windshield) by adjusting the projection position on the screen 1002. Further the screen 1002 is movable by the screen-driving unit 1003 in the range between the positions 1003*a* and 1003*b*. Adjusting the position of the screen 1002 can vary the depth (distance) of the projected image from the driver 1010 in the real world. In one example, the movable range of the screen 1002 (distance between positions 1003*a* and 1003*b*) may be 5 mm, which correspond to from 5 m away to infinity in the real world. The use of the 3D HUD 231 allows the driver 1010 to perceive the projected image exist in the real world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D HUD 231 depicted in FIG. 2B is provided by way of example. Other examples are possible. These examples may include heads-up displays having more or less complexity than the 3D HUD 231 depicted in FIG. 2B. For example, it is anticipated that in the future there will be heads-up displays that do not require movable parts such as the movable screen 1002. For example, a static screen that does not move may be deployed. The heads-up display deployed may not be a two-dimensional heads-up display unit. The ground adjustment application 199 described above with reference to FIG. 2A is designed to be operable with such components.

Figure 2C:
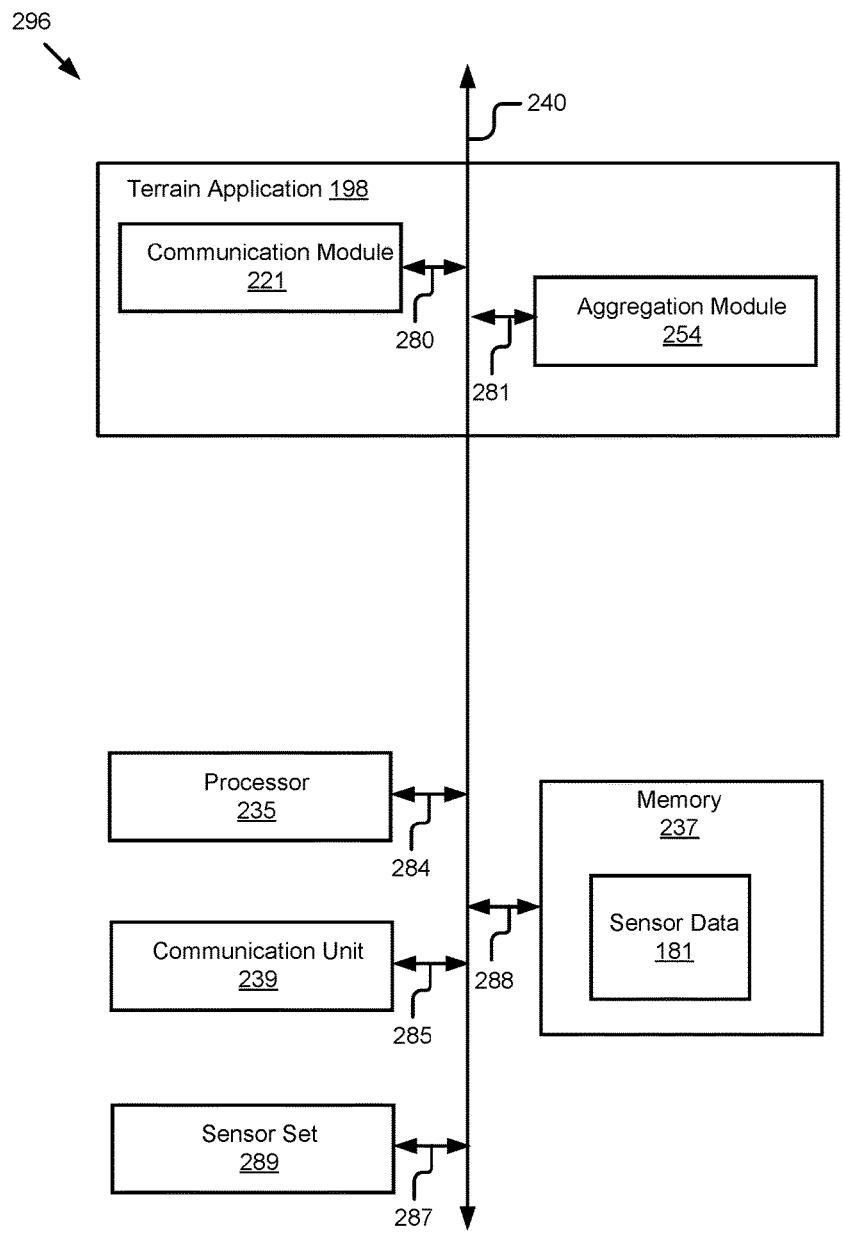
FIG. 2C is a block diagram illustrating an example computer system including a terrain application according to some implementations.

Referring now to FIG. 2C, depicted is a block diagram illustrating an example computer system 296 including a terrain application 111 according to some implementations. As depicted, the computer system 296 includes the terrain application 111, a processor 235, a memory 237, a sensor set 289 and a communication unit 239. The computer system 296 may include sharing vehicle 106 or the RSU 101. The components of the computer system 296 are communicatively coupled by a bus 240.

The processor 235, sensor set 289 and the communication unit 239 are similar to the processor 225, sensor set 212 and the communication unit 245 that are discussed with reference to FIG. 2A and, so, these descriptions will not be discussed again. The processor 235 is communicatively coupled to the bus 240 via a signal line 284. The sensor set 289 is communicatively coupled to the bus 240 via a signal line 287. The communication unit 239 is communicatively coupled to the bus 240 via a signal line 285. The memory 237 is communicatively coupled to the bus 240 via a signal line 288.

The memory 237 stores instructions or data that may be accessed and executed by the processor 235. The memory 237 is coupled to the bus 240 for communication with the other components via a signal line 288. The instructions or data may include code for performing the techniques described herein. The memory 237 may be a dynamic random access memory (DRAM) device, a static random access memory (SRAM) device, flash memory, or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2C, the memory 237 may store the sensor data 181. The sensor data 181 was described above with reference to FIG. 1B, and so, that description will not be repeated here. The sensor data 181 may be captured by the sensor set 289 and stored in the memory 237. In some implementations, the terrain application 111 may share the sensor data 181 with the vehicle 103 via the network 105. For example, the communication unit 239 may provide the sensor data 181 to the network 105 via DSRC, wireless full-duplex communication, 3G, 4G, Wi-Fi or some other wireless communication supported by the communication unit 239.

In some implementations, the terrain application 111 includes a communication module 221 and an aggregation module 254.

The communication module 221 may be communicatively coupled to the bus 240 via a signal line 280. The aggregation module 254 may be communicatively coupled to the bus 240 via a signal line 281.

The communication module 221 can be software including routines for handling communications between the terrain application 111 and other components of the computer system 296. In some implementations, the communication module 221 can be a set of instructions executable by the processor 235 to provide the functionality described below for handling communications between the terrain application 111 and other components of the computer system 296. In some implementations, the communication module 221 can be stored in the memory 237 of the computer system 296 and can be accessible and executable by the processor 235.

The communication module 221 sends and receives data, via the communication unit 239, to and from one or more of the elements of the operating environment 100. For example, the communication module 221 causes the communication unit 239 to transmit the sensor data 181 to the network 105 so that the vehicle 103 may receive the sensor data 181 from the network 105. The sensor data 181 may include, for example, pointcloud data which improves the elevation grid of the vehicle 103.

In some implementations, the communication module 221 receives data from components of the computer system 296 and stores the data in the memory 237. For example, the communication module 221 receives the sensor data 181 from the sensor set 289 and stores the sensor data 181 in the memory 237.

In some implementations, the communication module 221 may handle communications between components of the terrain application 111.

The aggregation module 254 can be software including routines for causing the sensor set 289 to collect the sensor data 181. The aggregation module 254 may coordinate which of the sensors of the sensor set 289 are active at a given time. The aggregation module 254 may signal the communication module 221 to transmit the sensor data 181 to the network 105 for receipt by the vehicle 103. The communication module 221 may cause the communication unit 239 to transmit a wireless message to the network 105 that includes the sensor data 181.

In some implementations, the aggregation module 254 can be stored in the memory 237 of the computer system 296 and can be accessible and executable by the processor 235.

Methods

Figure 3A:
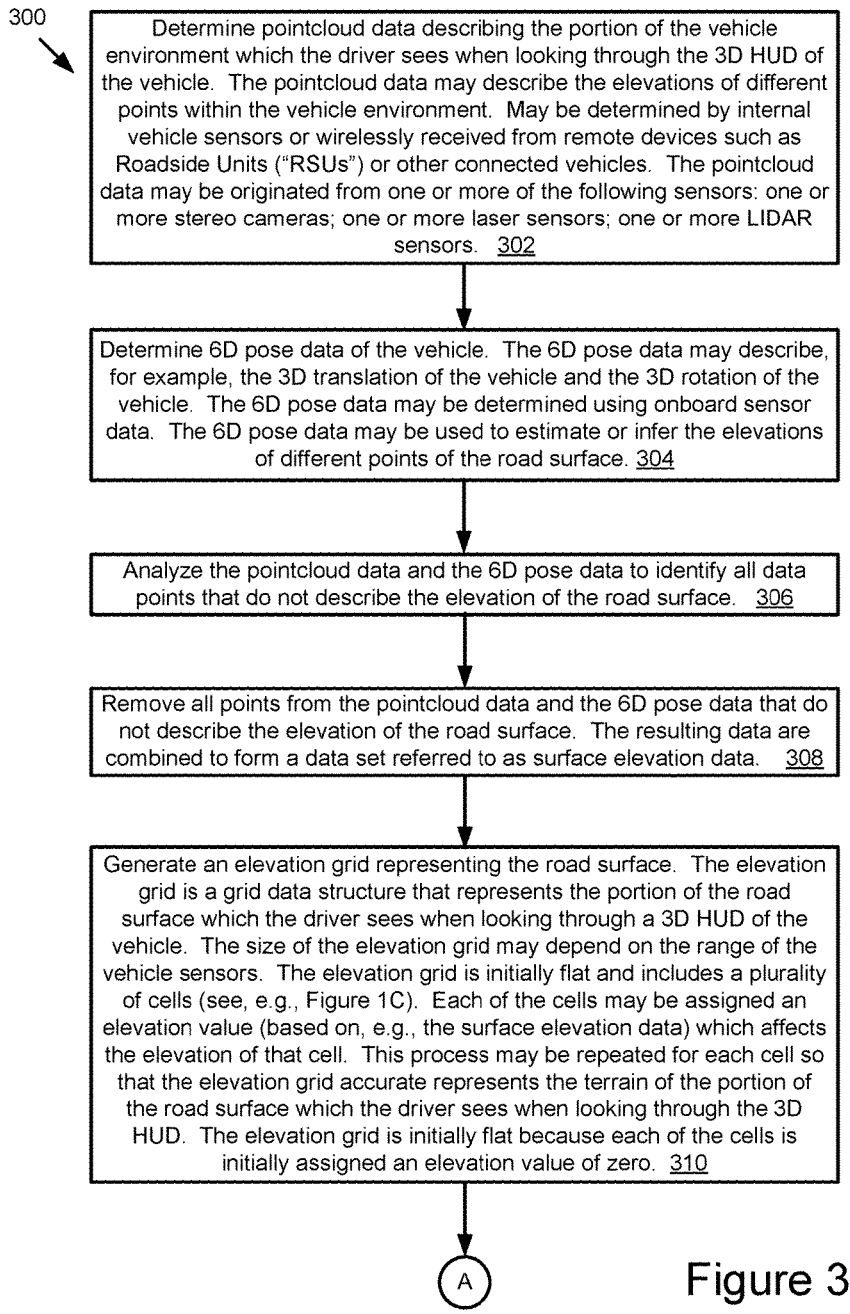
FIGS. 3A-3C are a flowchart of an example method for displaying a graphic on a 3D HUD where the graphic is displayed at a location on the 3D HUD that is adjusted for the varying terrain of the road surface according to some implementations.
Figure 3B:
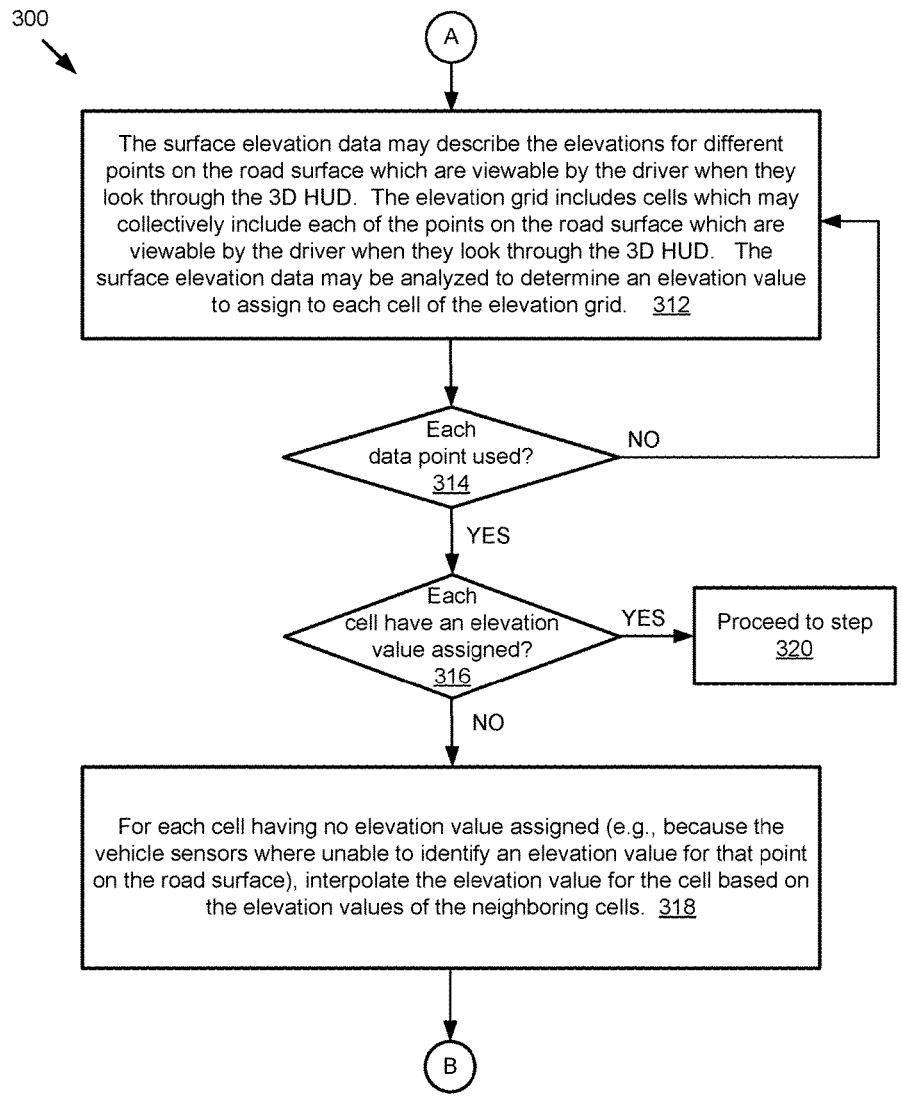
Figure 3C:
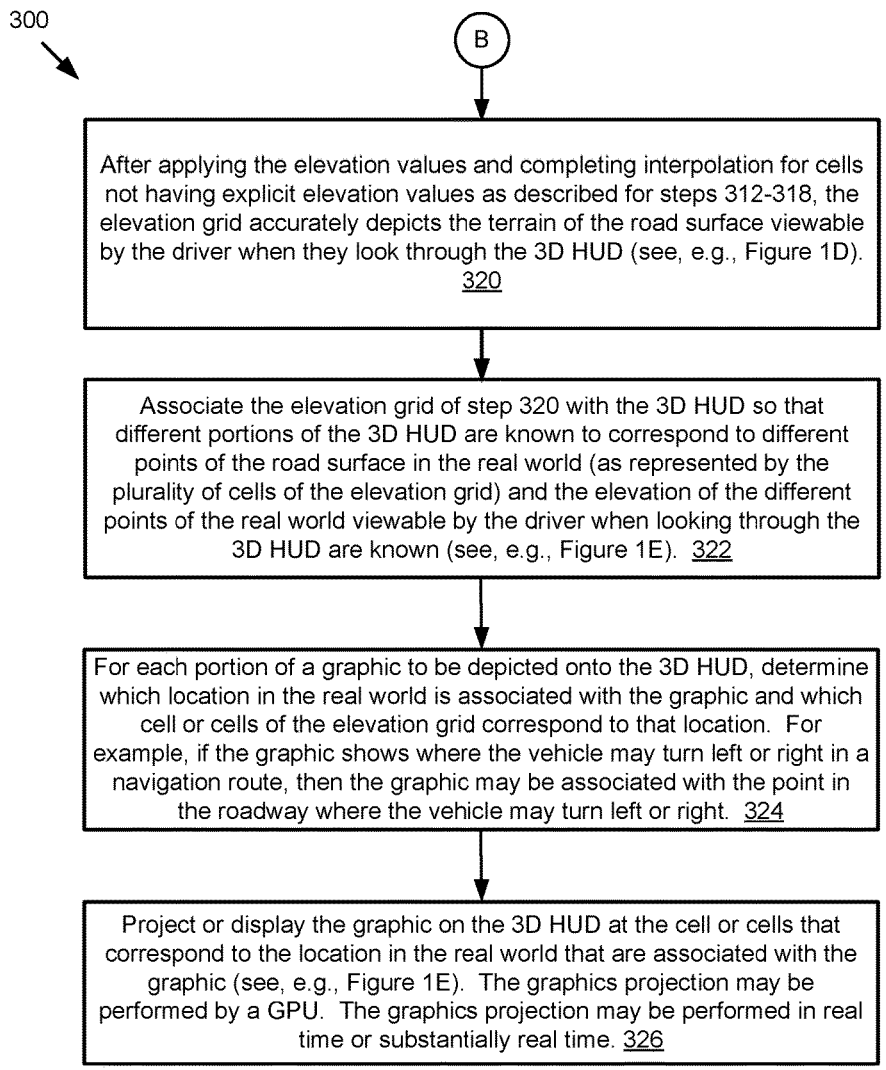

FIGS. 3A-3C are a flowchart of an example of a method 300 for displaying a graphic on a 3D HUD where the graphic is displayed at a location on the 3D HUD that is adjusted for the varying terrain of the road surface according to some implementations.

At step 302 the pointcloud data may be determined. The pointcloud data may describe a portion of the vehicle environment which the driver sees when looking through the 3D HUD of the vehicle. The pointcloud data may describe the elevations of different points within the vehicle environment. May be determined by internal vehicle sensors or wireless sly received from remote devices such as RSUs or other connected vehicles such as the sharing vehicle. The pointcloud data may be originated from one or more of the following sensors: one or more stereo cameras; one or more laser sensors; one or more LIDAR sensors At step 304 the 6D pose data may be determined. The 6D pose data may describe, for example, the 3D translation of the vehicle and the 3D rotation of the vehicle. The 6D pose data may be determined using onboard sensor data (e.g., sensor data 181 of the vehicle 103). The 6D pose data may be used to estimate or infer the elevations of different points of the road surface.

At step 306 pointcloud data and the 6D pose data may be analyzed to identify all data points that do not describe the elevation of the road surface.

At step 308 all points from the pointcloud data and the 6D pose data that do not describe the elevation of the road surface may be removed (or culled). The resulting data may be combined to form the surface elevation data.

At step 310 an elevation grid representing the road surface is generated or constructed. The elevation grid may include a grid data structure that represents the portion of the road surface which the driver sees when looking through a 3D HUD of the vehicle. The size of the elevation grid may depend on the range of the vehicle sensors. The elevation grid is initially flat and includes a plurality of cells (see, e.g., FIG. 1C). Each of the cells may be assigned an elevation value (based on, e.g., the surface elevation data) which affects the elevation of that cell. This process may be repeated for each cell so that the elevation grid accurate represents the terrain of the portion of the road surface which the driver sees when looking through the 3D HUD. The elevation grid is initially flat because each of the cells is initially assigned an elevation value of zero.

Referring now to FIG. 3B. At step 312, the surface elevation data may describe the elevations for different points on the road surface which are viewable by the driver when they look through the 3D HUD. The elevation grid may include cells which may collectively include each of the points on the road surface which are viewable by the driver when they look through the 3D HUD. The surface elevation data may be analyzed to determine an elevation value to assign to each cell of the elevation grid.

At step 314, a determination may be made regarding whether each data point of the surface elevation data is used (e.g., assigned to a cell of the elevation grid). If the determination indicates that each data point is not used, then the method 300 may proceed to step 312. If the determination indicates that each data point is used, then the method 300 may proceed to step 316.

At step 316, a determination may be made regarding whether each cell of the elevation grid is assigned an elevation value. If the determination indicates that each cell is assigned an elevation value, then the method 300 may proceed to step 320 described below with reference to FIG. 3C. If the determination indicates that each cell is not assigned an elevation value, then the method 300 may proceed to step 318.

At step 318, for each cell having no elevation value assigned (e.g., because the vehicle sensors where unable to identify an elevation value for that point on the road surface), interpolate the elevation value for the cell based on the elevation values of the neighboring cells.

Referring now to FIG. 3C. At step 320, after applying the elevation values and completing interpolation for cells not having explicit elevation values as described for steps 312-318, the elevation grid may accurately depict the terrain of the road surface viewable by the driver when they look through the 3D HUD (see, e.g., FIG. 1D).

At step 322, the elevation grid of step 320 may be associated with the 3D HUD so that different portions of the 3D HUD are known to correspond to different points of the road surface in the real world (as represented by the plurality of cells of the elevation grid) and the elevation of the different points of the real world viewable by the driver when looking through the 3D HUD are known (see, e.g., FIG. 1E).

At step 324, for each portion of a graphic to be depicted onto the 3D HUD, a location in the real world is associated with the graphic and which cell or cells of the elevation grid correspond to that location may be determined. For example, if the graphic shows where the vehicle may turn left or right in a navigation route, then the graphic may be associated with the point in the roadway where the vehicle may turn left or right.

At step 326, the graphic may be projected or displayed on the 3D HUD at the cell or cells that correspond to the location in the real world that are associated with the graphic (see, e.g., FIG. 1E).

Referring now to FIG. 1A, one or more of the following devices may be a communication device: a vehicle 103; a sharing vehicle 106 and an RSU 101. Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the vehicle 103, the sharing vehicle 106 and the RSU 101 as described above may include a full duplex coordination system for implementing full-duplex wireless communications. The full duplex coordination system may include a processor and a memory storing instructions that, when executed, cause the full duplex coordination system to: create, at a first communication device (such as the vehicle 103), first data (such as a request for sensor data) to transmit to a second communication device (such as the sharing vehicle 106 or the RSU 101.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as a message including the sensor data) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data from a first communication device via a wireless channel; determine that a second communication device is a single destination of the first data based on the first portion of the first data; determine that the second communication device has second data (such as sensor data) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in a vehicle 103 or a sharing vehicle 106 such as is depicted in FIG. 1A) or other communication devices that have full-duplex communication capability (for example, the RSU 101). In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of this disclosure. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in this disclosure to "some implementations" or "some instances" means that a particular feature, structure, or characteristic described in connection with the implementations or instances can be included in at least one implementation of the description. The appearances of the phrase "in some implementations" in various places in this disclosure are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of this disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This disclosure can take the form of some entirely hardware implementations, some entirely software implementations or some implementations containing both hardware and software elements. In some preferred implementations, this disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-readable medium may be a tangible or non-transitory computer-readable storage medium. The computer-readable medium may store computer executable code. The computer-readable medium may be communicatively coupled to a processor. The processor may be programmed to execute one or more portions of the computer-executable code.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, this disclosure is not described with reference to any particular programming language. It will be appreciated that a variety of programming languages may be used to implement the teachings of this disclosure as described herein.

The foregoing description of the implementations of this disclosure has been presented for the purposes of illustration and description. It is not intended to be exhaustive or to limit this disclosure to the precise form disclosed. Many modifications and variations are possible in light of the above teaching. It is intended that the scope of the disclosure be limited not by this detailed description, but rather by the claims of this application. As will be understood by those familiar with the art, this disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement this disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of this disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of this disclosure, which is set forth in the following claims.

What is claimed is:

1. A computer program product comprising a non-transitory computer-usable medium including a computer-readable program, wherein the computer-readable program when executed on a computer of a vehicle causes the computer to:
    wirelessly receive pointcloud data describing a road surface from an external device, wherein the pointcloud data is wirelessly received via a message communicated via Dedicated Short Range Communication;
    determine six-dimensional pose data of the vehicle;
    analyze the pointcloud data and the six-dimensional pose data to identify data points that fail to describe an elevation of the road surface;
    generate a subset of the pointcloud data that excludes the data points that fail to describe the elevation of the road surface;
    determine, based on the subset of the pointcloud data, a terrain for the road surface;
    construct an elevation grid that includes a plurality of cells, wherein one or more cells in the plurality of cells is assigned an elevation value based on a data point in the subset of pointcloud data corresponding to a similar road surface position of the one or more cells in the plurality of cells;
    for each cell of the plurality of cells with no elevation value assigned, determine an interpolated elevation value based on elevation values of neighboring cells; and
    display the elevation grid on a three-dimensional heads-up display (3D HUD) based on the elevation values and one or more interpolated elevation values.

2. The computer program product of claim 1, wherein the pointcloud data describes a plurality of elevation values for a plurality of points included in the terrain.

3. The computer program product of claim 2, wherein determining the terrain includes determining, based on a vehicle location, corresponding ranges between the vehicle and the plurality of points.

4. The computer program product of claim 1, wherein the external device generates the pointcloud data based on sensor data generated by at least one of a three-dimensional scanner, a light detection and ranging (LIDAR) sensor, a laser-based range finder, and a stereoscopic camera.

5. The computer program product of claim 1, wherein the pointcloud data describes elevations of a plurality of points on the road surface relative to one another.

6. The computer program product of claim 1, wherein the external device is one or more of a roadside unit and a sharing vehicle.

7. The computer program product of claim 1, wherein the 3D HUD further includes a graphic that corresponds to a real-world location and the graphic is associated with one or more cells of the plurality of cells in the elevation grid.

8. The computer program product of claim 1, wherein the six-dimensional pose data of the vehicle describes (1) a three-dimensional translation of the vehicle and (2) a three-dimensional rotation of the vehicle.

9. A computer-implemented method executed on a vehicle, the method comprising:
    wirelessly receiving pointcloud data describing a road surface from an external device, wherein the pointcloud data is wirelessly received via a message communicated via Dedicated Short Range Communication;

determining six-dimensional pose data of the vehicle;

analyzing the pointcloud data and the six-dimensional pose data to identify data points that fail to describe an elevation of the road surface;

generating a subset of the pointcloud data that excludes the data points that fail to describe the elevation of the road surface;

determining, based on the subset of the pointcloud data, a terrain for the road surface;

constructing an elevation grid that includes a plurality of cells, wherein one or more cells in the plurality of cells is assigned an elevation value based on a data point in the subset of pointcloud data corresponding to a similar road surface position of the one or more cells in the plurality of cells;

for each cell of the plurality of cells with no elevation value assigned, determining an interpolated elevation value based on elevation values of neighboring cells; and displaying the elevation grid on a three-dimensional heads-up display (3D HUD) based on the elevation values and one or more interpolated elevation values.

10. The method of claim 9, wherein the pointcloud data describes a plurality of elevation values for a plurality of points included in the terrain.

11. The method of claim 10, wherein determining the terrain includes determining, based on a vehicle location, corresponding ranges between the vehicle and the plurality of points.

12. The method of claim 9, wherein the external device generates the pointcloud data based on sensor data generated by at least one of a three-dimensional scanner, a light detection and ranging (LIDAR) sensor, a laser-based range finder, and a stereoscopic camera.

13. The method of claim 9, wherein the pointcloud data describes elevations of a plurality of points on the road surface relative to one another.

14. The method of claim 9, wherein the external device is one or more of a roadside unit and a sharing vehicle.

15. The method of claim 9, wherein the 3D HUD further includes a graphic that corresponds to a real-world location and the graphic is associated with one or more cells of the plurality of cells in the elevation grid.

16. The method of claim 15, wherein the six-dimensional pose data of the vehicle describes (1) a three-dimensional translation of the vehicle and (2) a three-dimensional rotation of the vehicle.

17. A system comprising:

a display device installed in a vehicle; and a memory storing instructions that, when executed, cause the system to:

wirelessly receive pointcloud data describing a road surface from an external device, wherein the pointcloud data is wirelessly received via a message communicated via Dedicated Short Range Communication;

determine six-dimensional pose data of the vehicle;

analyze the pointcloud data and the six-dimensional pose data to identify data points that fail to describe an elevation of the road surface;

generate a subset of the pointcloud data that excludes the data points that fail to describe the elevation of the road surface;

determine, based on the subset of the pointcloud data, a terrain for the road surface;

construct an elevation grid that includes a plurality of cells, wherein one or more cells in the plurality of cells is assigned an elevation value based on a data point in the subset of pointcloud data corresponding to a similar road surface position of the one or more cells in the plurality of cells;

for each cell of the plurality of cells with no elevation value assigned, determine an interpolated elevation value based on elevation values of neighboring cells; and display the elevation grid on a three-dimensional heads-up display (3D HUD) based on the elevation values and one or more interpolated elevation values.

18. The system of claim 17, wherein the pointcloud data describes a plurality of elevation values for a plurality of points included in the terrain.

19. The system of claim 18, wherein determining the terrain includes determining, based on a vehicle location, corresponding ranges between the vehicle and the plurality of points.

20. The system of claim 17, wherein the external device generates the pointcloud data based on sensor data generated by at least one of a three-dimensional scanner, a light detection and ranging (LIDAR) sensor, a laser-based range finder, and a stereoscopic camera.

* * * * *